US009903617B2

(12) United States Patent
Hunt, Jr. et al.

(10) Patent No.: US 9,903,617 B2
(45) Date of Patent: Feb. 27, 2018

(54) ENGINE HEATER CONTROL SYSTEM

(71) Applicant: HOTSTART, Inc., Spokane, WA (US)

(72) Inventors: James Wilbur Hunt, Jr., Coeur d'Alene, ID (US); Gregory Russell Walters, Newman Lake, WA (US); Clinton Douglas Hermance, Coeur d'Alene, WA (US); Jody Wayne Gaylord, Post Falls, WA (US); Christopher Michael McFarland, Spokane, WA (US); Michael P. Merritt, Spokane, WA (US)

(73) Assignee: HOTSTART, Inc., Spokane, WA (US)

( * ) Notice: Subject to any disclaimer, the term of this patent is extended or adjusted under 35 U.S.C. 154(b) by 586 days.

(21) Appl. No.: 13/840,569

(22) Filed: Mar. 15, 2013

(65) Prior Publication Data

US 2014/0263261 A1 Sep. 18, 2014

(51) Int. Cl.

*B60L 1/02* (2006.01)
*F24J 3/00* (2006.01)
*F02N 19/02* (2010.01)
*F02D 29/06* (2006.01)
*F02D 41/22* (2006.01)

(52) U.S. Cl.

CPC ................ *F24J 3/00* (2013.01); *F02D 29/06* (2013.01); *F02N 19/02* (2013.01); *F01P 2060/18* (2013.01); *F02D 41/22* (2013.01); *F02N 2200/12* (2013.01)

(58) Field of Classification Search

CPC ... B23K 9/10; H05B 3/00; H05B 1/00; H05B 1/0236

USPC ... 219/137 PS, 136, 133, 200, 205, 201, 202

See application file for complete search history.

(56) References Cited

U.S. PATENT DOCUMENTS

| | | | | | |
|---|---|---|---|---|---|
| 5,280,158 | A * | 1/1994 | Matava | G05D 23/1904 | 123/142.5 R |
| 6,196,177 | B1 * | 3/2001 | VanderBok | F01M 5/021 | 123/142.5 E |
| 8,612,092 | B2 * | 12/2013 | Okamoto | B60H 1/00735 | 165/202 |
| 8,690,548 | B1 * | 4/2014 | Solomon | F25B 27/00 | 417/393 |
| 2006/0208572 | A1 * | 9/2006 | Zansky | G06F 1/30 | 307/66 |
| 2007/0114954 | A1 * | 5/2007 | Hampo | B60L 11/1868 | 318/105 |
| 2007/0118191 | A1 * | 5/2007 | Godara | A61B 18/14 | 607/96 |
| 2008/0242369 | A1 * | 10/2008 | Kazuta | G06F 1/3203 | 455/573 |

(Continued)

*Primary Examiner* — Dana Ross
*Assistant Examiner* — Ayub Maye
(74) *Attorney, Agent, or Firm* — Lee & Hayes, PLLC

(57) ABSTRACT

An energy consumption controller may be communicatively coupled with a plurality of alternative energy sources and an engine. The controller may be configured to manage energy consumption from the alternative energy sources interconnected with the engine and to keep the engine within a desired temperature range. Within the desired temperature range, the engine will start and run at a full load more rapidly than if the engine cooled excessively. The controller may change the selected energy source as required, based on factors such as cost, engine maintenance and testing and/or imminent need of the engine.

17 Claims, 13 Drawing Sheets

(56) References Cited

U.S. PATENT DOCUMENTS

| | | | | |
|---|---|---|---|---|
| 2009/0229288 A1* | 9/2009 | Alston | B60H 1/00428 | 62/236 |
| 2009/0229570 A1* | 9/2009 | Ulrey | F02D 41/20 | 123/431 |
| 2010/0193489 A1* | 8/2010 | Beeson | B23K 9/1056 | 219/133 |
| 2010/0320183 A1* | 12/2010 | Borchert | B23K 9/1006 | 219/130.1 |
| 2011/0180522 A1* | 7/2011 | Bunker | B23K 9/1075 | 219/130.21 |
| 2011/0288701 A1* | 11/2011 | Chen | B60W 10/06 | 701/22 |
| 2012/0047894 A1* | 3/2012 | Ward | F01B 1/08 | 60/716 |
| 2012/0049638 A1* | 3/2012 | Dorn | H02J 3/42 | 307/87 |
| 2012/0286052 A1* | 11/2012 | Atluri | B60K 16/00 | 237/28 |
| 2013/0092126 A1* | 4/2013 | Leone | F02D 9/1055 | 123/399 |
| 2013/0119037 A1* | 5/2013 | Daniel | B23K 9/095 | 219/130.21 |
| 2013/0178992 A1* | 7/2013 | De Graeve | F24D 17/00 | 700/286 |
| 2013/0200055 A1* | 8/2013 | Enyedy | B23K 9/124 | 219/130.21 |

* cited by examiner

ENGINE HEATER CONTROL SYSTEM

BACKGROUND

Engine heating processes, equipment and systems consume electric power to warm engines allowing the engines to start and run at full load rapidly as compared to cold engines. With ever increasing of costs of energy, systems and methods of managing energy consumption by engine heaters are desired. For example, data center organizations, hospitals organizations, transportation organizations, may desire to reduce power consumption of engine heaters arranged with engines in systems of these organizations to reduce cost.

Existing engine heating processes, equipment and systems have limited awareness of an engine's environment. For instance, engine heaters have traditionally been utilized at an engine level (e.g., a standby generator at a datacenter), and arranged to be aware of only an electric utility power to keep the generator warm. For example, a datacenter organization may install an engine heater, on a backup generator, configured to consume only electricity from a public utility to keep the generator warm until a critical time of use. While this approach helps ensure that the generator will be ready to operate at a critical time of need, it does not provide visibility to available and potentially lower cost, alternative energy sources to keep the generator warm.

A user, technician, facilities administrator, or other individual may view information associated with an engine heater through an interface. For example, the interface may display an icon corresponding to an engine heater's status (i.e., heater on or off), temperature, pressure, and/or presence of fluid. However, due to a lack of the engine heater's awareness, the interface cannot display icons corresponding to an availability of alternate energy sources. Moreover, due to the lack of the engine heater's awareness, the interface cannot display icons corresponding to user inputs arranged to remotely manage the engine heater's consumption of alternate energy sources.

SUMMARY

This summary is provided to introduce simplified concepts for an energy consumption controller and method, which is further described below in the Detailed Description. This summary is not intended to identify essential features of the claimed subject matter, nor is it intended for use in determining the scope of the claimed subject matter.

In one example, a controller may be communicatively coupled with each of a plurality of energy sources and an engine. The controller may select an energy source from the plurality of energy sources available. The controller may subsequently utilize the selected energy source to keep the engine within a desired temperature range. The controller may then change to another energy source to keep the engine within the desired temperature range based at least in part on a cost of energy of each of the plurality of energy sources.

In another example, a method of heating an engine may comprise selecting an energy source from a plurality of energy sources, and utilizing the selected energy source to keep the engine within a desired temperature range. The method may include changing to another energy source to keep the engine within the desired temperature range based at least in part on cost. A controller may evaluate changing to another energy source.

In another example, one or more computer-readable media may comprise computer-executable instructions to perform acts similar to those performed by the controller.

BRIEF DESCRIPTION OF THE DRAWINGS

The detailed description is described with reference to the accompanying figures. The use of the same reference numbers in different figures indicates similar or identical items.

DETAILED DESCRIPTION

Overview

Figure 1:
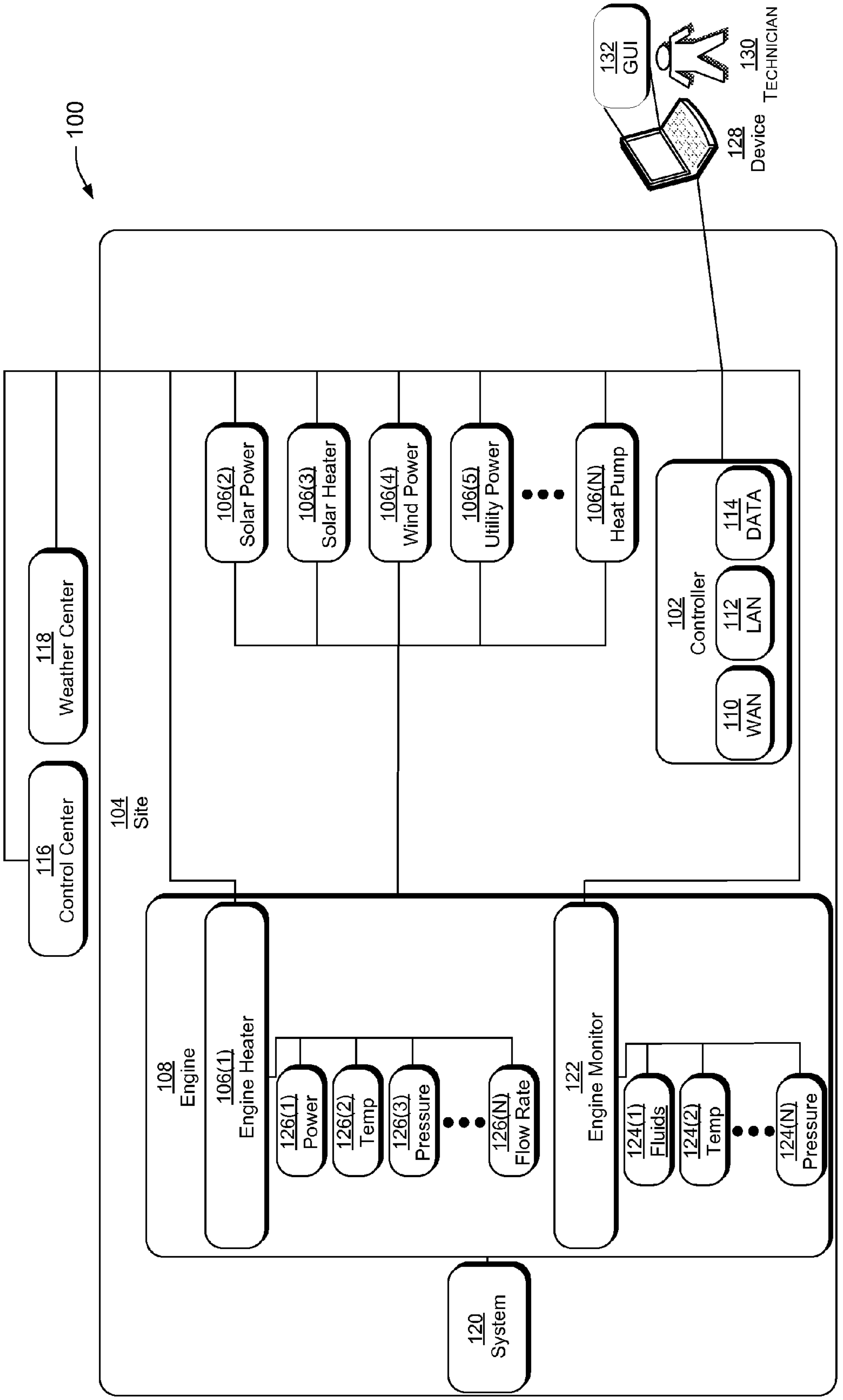
FIG. 1 illustrates an example implementation of a controller for use in a site including a plurality of alternative energy sources.

This disclosure is directed to an energy consumption controller and method. In some of the energy consumption control implementations, a controller may be disposed at a site of an organization to receive inputs and provide outputs to control consumption of alternative energy sources to keep an engine warm at the site. In some of the energy consumption control implementations and methods, a server may receive reported inputs and outputs for a site of an organization, and provide a GUI to manage energy consumption of alternative energy sources to keep an engine warm at the site.

Traditional engine heating systems have been installed in engines and arranged to receive electric power from a public utility. For example, an organization may simply install a resistance heater in an engine, configured to consume only electric utility power to keep the engine warm. Moreover, traditional heaters are configured to utilize a specific wattage and voltage. Similarly, traditional control systems configured to control traditional heaters are also configured to be setup to utilize only electric utility power. For example, traditional controllers are configured to be setup based only on amps, volts, number of resistance heaters, and number of thermostats. Because traditional engine heating systems and methods simply utilize a single source of power, they are not capable of controlling consumption of alternate energy sources to warm an engine at a reduce cost.

For example, traditional engine heating systems and methods are not able to select an energy source from a plurality of energy sources to keep an engine with in a desired temperature range, let alone change from one energy source to another energy source to keep the engine with in the desired temperature range. For example, traditional engine heating systems and methods are not able to change from one energy source to another energy source to keep the engine with in the desired temperature range based on a cost of each of the plurality of energy sources, or a change in availability of energy from the plurality of energy sources. Having the ability to select an energy source from a plurality of energy sources to keep an engine with in a desired temperature range, and/or change from one energy source to another energy source to keep the engine with in the desired temperature range will allow for optimizing an organization's facility and reduce power consumption costs.

Traditional engine heating systems and methods have limited ability to view and audit energy source configurations, installations, diagnostics, and do not have a graphical user interface (GUI) to provide external auditors or internal company personnel to easily view and audit energy source configurations, installations, and diagnostics of an organization's facility. For example, some traditional engine heating systems may only have a graphical display of information and some logging. Having the ability to view and audit energy source configurations, installations, and diagnostics of an organization's facility on a GUI may reduce operating expenses for an organization.

Accordingly, this disclosure describes systems and methods for controlling consumption of alternative energy sources to keep an engine warm, which may result in a reduction of operating expenses of a site for an organization. To achieve these systems, in one example this application describes a site having a plurality of energy sources interconnected with an engine. Moreover, the site includes a controller communicatively coupled with the plurality of energy sources and the engine to control consumption of energy from each of the plurality of energy sources. In another example this application describes an energy consumption server communicatively coupled with a plurality of controllers, each controller arranged at a site of an organization.

The controller arranged in the organization's site may be arranged with an engine system. The controller being communicatively coupled with each of the plurality of energy sources and the engine. The controller may be configured to monitor an availability of energy from each of the plurality of energy sources. Each energy source being associated with a cost. Thus, the communicatively coupled controller reports each energy sources availability and cost, thereby increasing awareness of the plurality of energy sources usage at the site.

Because these controllers are aware of the plurality of energy sources and the engines arranged at sites of organizations, data is provided. This allows for diagnostics and optimization purposes. For example, because consumption of energy of each of the plurality of energy sources is monitored, a central database (e.g., a central server) may track energy consumption of warming an engine and determine an optimized energy contribution by each of the plurality of energy sources to keep the engine within a desired temperature range. Moreover, because parameters of each of the plurality of energy sources and the engine are monitored, the central database may track operation of the plurality of energy sources and/or the engine and determine where an error had been made installing equipment to any of the individual energy sources and/or the engine based on analysis of the data. Specifically, a server may determine that a fluid inlet and/or outlet temperature, a pressure, a flow rate, a voltage, a current, a resistance, a frequency, etc. may have higher and/or lower values than a specification for the individual energy sources and/or the engine calls for.

The controller arranged with an organization's site may comprise a control board communicatively coupled with equipment of the plurality of energy sources and/or the engine. For example, the control board may be arranged with the engine and be communicatively coupled with a pump arranged with a solar heater, a switch arranged with a battery of a solar panel and/or a wind turbine, a switch arranged with a public utility outlet, a valve arranged with a heat pump, or the like. The equipment may include commercial of-the-shelf (COTS) control boards. The equipment may be configured to open, close, turn on, turn off, or the like, based on a control signal received from the control board. Further, each piece of equipment may be identified with a respective one of the plurality of energy sources. Thus, the control board is configured to receive control signals to control each piece of equipment arranged in the organization's site and to receive inputs from each piece of equipment arranged in the organization's site, thus allowing more informed decisions to be made regarding consumption of alternative energy sources at the organization's site.

In some implementations the control board may be communicatively coupled with a control center. For example, the control center may be a facility management system of the organization's site and the control board communicatively coupled with the plurality of energy sources and the engine may be communicatively coupled with the facility management system. The control board may control the equipment of the plurality of energy sources and/or the engine based on a control signals received from the facility management system.

Because the controller arranged in an organization's sites receive inputs from each of the plurality of energy sources and the engine within the site, and because the controller receives control signals for each of the plurality of energy sources and the engine remotely, each of the plurality of energy sources and the engine may be controlled remotely. Thus, by controlling each of the plurality of energy sources and the engine arranged in the organization's site, the consumption of energy from each of the plurality of energy sources to warm the engine may be efficiently managed to consume energy. Thus a cost of warming an engine can be reduced for an organization.

The controller collects data from each of the plurality of energy sources and the engine. The controller may report the collected data to an energy consumption server. The controller may store the collected data in memory (e.g., embedded memory removable memory, onboard memory, memory card etc.). The energy consumption server may receive data from a plurality of controllers, each controller arranged at an organization's site. The energy consumption server may aggregate the data. The data may comprise reported engine temperature, desired engine temperature, reported engine state (i.e., running or not running), reported engine readiness state (e.g., minimum start temperature, medium start temperature, ready to assume full power), reported coolant type (e.g., specific heat), reported coolant temperature (e.g., coolant inlet and outlet temperatures), reported coolant flow rate (e.g., pump running or not running, pump primed or not primed), reported lube oil temperature (e.g., lube oil inlet and outlet temperatures), reported engine exercise schedule, reported engine service schedule, reported engine system information (e.g., engine use information, engine serial number, engine specifications, etc.), and/or fault signals. The data may further comprise availability of energy from each of the plurality of energy sources (e.g. energy from solar power, solar heater, wind power, utility power, heat pump, or the like). The data may comprise ambient temperature at a site, barometric pressure at a site, and/or a time of day at a site. Moreover, the data may comprise an engine heaters voltage, amperage, resistance, and/or a maximum wattage (e.g., power usage).

The energy consumption server may create and serve to a user device a graphical user interface (GUI) configured to allow a user manage energy consumption of alternative energy sources to keep an engine warm at any of the sites, audit energy consumption of alternative energy sources to keep an engine warm at any of the sites, and set parameters of the alternative energy sources and the engines at any of the sites. Thus, the server may have a database that stores data from each of sites useable with a GUI to optimize an energy contribution from each of the alternative energy sources to keep an engine warm at any of the sites. Thus, operating expenses of warming an engine can be reduced for an organization.

Example Controlling Systems

FIG. 1 illustrates an example implementation 100 of a controller 102 for use at a site 104 of an organization. The site 104 of the organization may be a facility (e.g., a server farm, a hospital, a high-rise building, a remote cell tower site, an urban cell tower site, an oil site, a gas site, etc.). Further, the site 104 of the organization may be a vehicle (e.g., a locomotive, a ship, a truck, etc.). The organization may be a business, a corporation, a partnership, a government, etc.

The site 104 may have access to a plurality of alternative energy sources 106(1), 106(2), 106(3), 106(4), 106(5), and 106(N) interconnected with an engine 108 to keep the engine 108 within a desired temperature range to allow the engine 108 to start and run at a full load relatively rapidly. The plurality of alternative energy sources 106(1)-106(N) may comprise an engine heater (e.g., resistance heater), solar power (e.g., photovoltaics), a solar heater (e.g., solar hot water panels), wind power (e.g., wind turbines), utility power, a heat pump (e.g., chillers), or the like. Moreover, the plurality of energy sources may include the engine's oil, the engine's coolant, and/or the engine itself. For example, the engine temperature may be maximized in order to use it as a thermal storage. For example, a solar heater may be used to maximize the engine temperature in order to use the engine as a thermal storage to delay activation of a resistance heater after the solar heater is no longer able to contribute to the heating of the engine.

The plurality of alternative energy sources 106(1)-106(N) may be interconnected with the engine 108 by incorporating individual pumps, valves, switches, wiring bus bars, and/or switchboards. Pluralities of interconnection scenarios are contemplated. For example, an individual pump for a solar hot water panel and an individual pump for a chiller may each interconnect with the engine 108. In another example, a single pump with individual valves for the solar hot water panel and the chiller may interconnect with the engine. Further, an individual switch (e.g., relay), for each of an engine heater, solar power, wind power, utility power may interconnect with the engine 108. In another example, a bus bar and/or switchboard may be utilized to interconnect the engine heater, solar power, wind power, utility power with the engine 108. The controller 102 may be communicatively coupled with the pumps, valves, switches, bus bars, and/or switchboards to manage energy consumption of the alternative energy sources 106(1)-106(N). For example, the controller 102 may turn on and/or off pumps, open and/or close valves, activate and/or deactivate switches, bus bars and/or switchboards to selectively consume energy from any one of the alternative energy sources 106(1)-106(N) to keep the engine 108 within a desired temperature range.

The controller 102 may comprise a WAN (wide area network) port 110, a LAN (local area network) port 112, and data 114. The WAN and/or LAN port could employ any type of communication protocol or signal. The controller 102 may be communicatively coupled, via the WAN port 110 and/or the LAN port 112, with each of the alternative energy sources 106(1)-106(N) to keep the engine 108 within a desired temperature range. For example, the controller 102 may be communicatively coupled, via the WAN port 110 and/or the LAN port 112, with the pumps, valves, switches, bus bars, and/or switchboards interconnected with the alternative energy sources 106(1)-106(N).

The controller 102 may be communicatively coupled, via the WAN port 110 and/or the LAN port 112, with a control center 116. For example, the controller 102 may be communicatively coupled with a facility management system to provide for a facilities administrator, or other individual to manage consumption of energy of each of the alternative energy sources 106(1)-106(N), and the engine 108. While FIG. 1 illustrates the control center 116 being remotely located from the site 104, the control center 116 may be arranged locally at the site 104. For example, a facility management system, a security team interface, a technician interface, or the like may be arranged at the site 104.

The controller 102 may change from one of the alternative energy sources 106(1)-106(N) to another one of the alternative energy sources 106(1)-106(N) based on a cost of the alternative energy sources 106(1)-106(N). For example, the controller 102 may change from a public utility power to a solar power because of a change in a cost (e.g., a rate increase) of the electric utility power. Moreover, the controller 102 may change from one of the alternative energy sources 106(1)-106(N) to another one of the alternative energy sources 106(1)-106(N) based on a change in an availability of energy from the alternative energy sources 106(1)-106(N). For example, the controller 102 may change from solar power to wind power based on availability of the sun and/or availability of wind. Further, the controller 102 may change from one of the alternative energy sources 106(1)-106(N) to another one of the alternative energy sources 106(1)-106(N) based on a parameter (e.g., a temperature threshold) of heating the engine 108. For example, the controller 102 may change from one of the alternative energy sources 106(1)-106(N) to another one of the alternative energy sources 106(1)-106(N) based on user defined configuration settings (e.g., a maximum temperature threshold). Further, the controller 102 may change from one of the alternative energy sources 106(1)-106(N) to another one of the alternative energy sources 106(1)-106(N) based on an operation schedule of the engine 108. The controller 102 may change from one of the alternative energy sources 106(1)-106(N) to another one of the alternative energy sources 106(1)-106(N) based on an exercise schedule of the engine 108.

The controller 102 may detect a parameter of the engine heater 106(1) or alternative heat source 106(1)-106(N) is outside a threshold and operate the engine heater 106(1) or alternative heat source 106(1)-106(N) at a reduced level and/or terminate operation of the engine heater 106(1) or alternative heat source 106(1)-106(N) based on the detected parameter. For example, the controller 102 may detect a fluid outlet temperature is outside a threshold and reduce the level of operation of the engine heater based on the detected fluid outlet temperature. In another example, the controller

102 may detect a lack of engine coolant and terminate operation of engine heater 106(1) or alternative heat source 106(1)-106(N) based on the detected lack of engine coolant. Moreover, the controller 102 may detect a parameter of the engine 108 and rate an installation of components interconnected with the engine based on the detected engine parameter. For example, the controller 102 may detect a flow rate of an engine coolant and rate the installation of a valve as being partially open and/or closed. Further, the controller 102 may detect a parameter of the engine 108 and diagnose a condition of the engine 108. For example, the controller 102 may detect a temperature of the engine 108 and diagnose an idle or terminated state of the engine 108.

The controller 102 may evaluate the change to the other energy source. For example, the controller 102 may evaluate the utilization of heat from the solar heater based on the solar heater's ability to raise the temperature of a fluid used to heat the engine 108. Further, the controller 102 may evaluate the utilization of energy from one of the alternative energy sources 106(1)-106(N) based on a capacity of the engine to act as a thermal storage. For example, the controller 102 may evaluate the utilization of heat from a solar heater based on the thermal storage capacity of the engine to delay activation of consumption of a resistance engine heater.

Further, the controller 102 may also be communicatively coupled with a weather center 118. For example, the controller 102 may be communicatively coupled with a weather service to provide for preemptively managing consumption of energy of each of the alternative energy sources 106(1)-106(N), and the engine 108 based on weather reports from the weather service. For example, the controller 102 may terminate a use of one of the alternative energy sources 106(1)-106(N) keeping the engine within a desired temperature range and initiate operation of the engine 108 based on an imminent threat of harsh weather (e.g., an incoming storm). In another example, the controller 102 may change from one of the alternative energy sources 106(1)-106(N) keeping the engine within a desired temperature range to change to another desired temperature range different from the desired temperature range to keep the engine within the other desired temperature range based at least in part on an imminent threat of harsh weather. The controller 102 may store, in memory, an imminent threat (e.g. storm risk) program that provides for the controller 102 to preemptively manage the use of the alternative energy sources 106(1)-106(N). The imminent threat program may be protected from being changed. Moreover, the controller 102 may store, in memory, a peak time program, a brownout program, or the like, that are protected from being changed.

The engine 108 may provide power for a system 120 of the site 104. For example, the engine 108 may provide power for a generator (e.g., backup generator), a pump (e.g., fire pump), a vehicle, etc. The engine 108 may include an engine monitor 122. The engine monitor 122 may be configured to show engine operating parameters. For example, the engine monitor 122 may be configured to display engine fluid states 124(1), engine temperature state 124(2), engine pressure state 124(N), or like. The engine monitor 122 may be a commercial of-the-shelf (COTS) engine monitor. For example, the engine 108 may be factory equipped with the engine monitor from the manufacturer of the engine 108. The controller 102 may be communicatively coupled, via the WAN port 110 and/or the LAN port 112, with the engine monitor 122. For example, the controller 102 may be communicatively coupled with the engine monitor 122 to receive engine operating parameters 124(1)-124(N). While FIG. 1 illustrates the controller 102 communicatively coupled with the engine monitor 122, the controller 102 may not be communicatively coupled with the engine monitor 122. For example, the controller 102 may be communicatively coupled directly with each of the engine operating parameters 124(1)-124(N), instead of indirectly communicatively coupled with each of the engine operating parameters 124(1)-124(N) through the engine monitor 122. Moreover, the engine 108 may not include an engine monitor 122, and the controller 102 may be communicatively coupled directly with each of the engine operating parameters 124(1)-124(N).

Each of the alternative energy sources 106(1)-106(N) may include operating parameters. The controller 102 may be communicatively coupled, via the WAN port 110 and/or the LAN port 112, with each of operating parameters of each of the alternative energy sources 106(1)-106(N). For example, the alternative energy source 106(1) may be an engine heater integrated with the engine 108 and configured to be setup based on engine heater operating parameters. For example, the energy source 106(1) may be configured to be setup based on engine heater power 126(1), engine heater temperature 126(2), engine heater pressure 126(3), engine heater flow rate 126(N), or the like. The controller 102 may be communicatively coupled with the energy source 106(1) to receive engine heater operating parameters 126(1)-126(N) and/or send engine heater operating parameters 126(1)-126(N).

The controller 102 may be communicatively coupled with a device 128. For example, a technician 130 may communicatively couple the device 128 to the WAN port 110 and/or LAN port 112 and interface with a GUI 132 to configure any of the operating parameters of the alternative energy sources 106(1)-106(N), operating parameters of the engine 108, and/or settings on the controller 102. Further, the controller 102 may comprise installation instructions stored in memory and configured specifically for any of the alternative energy sources 106(1)-106(N), the engine, and/or the site 104. For example, the controller 102 may comprise technical requirements (e.g., minimum hose and/or pipe size, fluid inlet and outlet integration points, fluid inlet and outlet size(s), valve(s) integration points, minimum valve size(s), required plumbing sealant type(s)) for installing a resistance engine heater on the engine 108. The technician 130 may interface with the GUI 132 to utilize the installation instructions for installing equipment for any of the alternative energy sources 106(1)-106(N) and/or the engine 108 at the site 104. For example, the technician 130 may interface with the GUI 132 to utilize installation instructions to integrate the resistance engine heater with the engine 108. Moreover, the technician 130 may interface with the GUI 132 to utilize diagnostics. For example, the technician 130 may interface with the GUI 132 to view warnings associated with a fault of one or more of the alternative energy sources 106(1)-106(N) and/or the engine 108.

The controller 102 may be a printed circuit assembly (PCA) arranged with the engine 108 and may comprise processors(s) and memory. The memory may be configured to store instructions executable on the processor(s). The controller 102 may comprise an open wireless technology (e.g., Bluetooth™) for exchanging data with a mobile device (e.g., handheld device, handheld computer, smartphone, mobile phone, personal digital assistant (PDA), or the like). Moreover, the controller 102 may be communicatively coupled with the one or more COTS control boards associated with equipment of the alternative energy sources 106(1)-106(N) and/or the engine 108. The controller 102 may be communicatively coupled with the one or more COTS control boards via a switch and a pulse-width modulation (PWM) signal. However, other suitable communication types are contemplated. For example, the controller may be communicatively coupled with one or more control boards (e.g., custom PCAs, COTS control boards, or the like) via a discrete digital line, a discrete analog line, an internet protocol (IP), or the like. The controller 102 data 114 may log data, which may be provided for review. For example, the technician 130 may utilize the device 128 to display real time data, displaying configuration of attached alternative energy sources 106(1)-106(N), and/or displaying historical data. The controller 102 may include a backup power source. For example, the controller 102 may include a backup battery as a source of backup of redundant power.

While FIG. 1 illustrates a single controller 102, multiple controllers may be used. For example, a modular or compound controller comprising multiple individual controllers configured to integrate or fit together is contemplated. The modular controller may integrate one or more individual controllers to add additional options. For example, a modular controller may be configured to control consumption of a first group of alternative energy sources to keep an engine warm, while another modular controller may integrate with the modular controller to control consumption of a second group of alternative energy sources different form the first group, to keep the engine warm.

Figure 2:
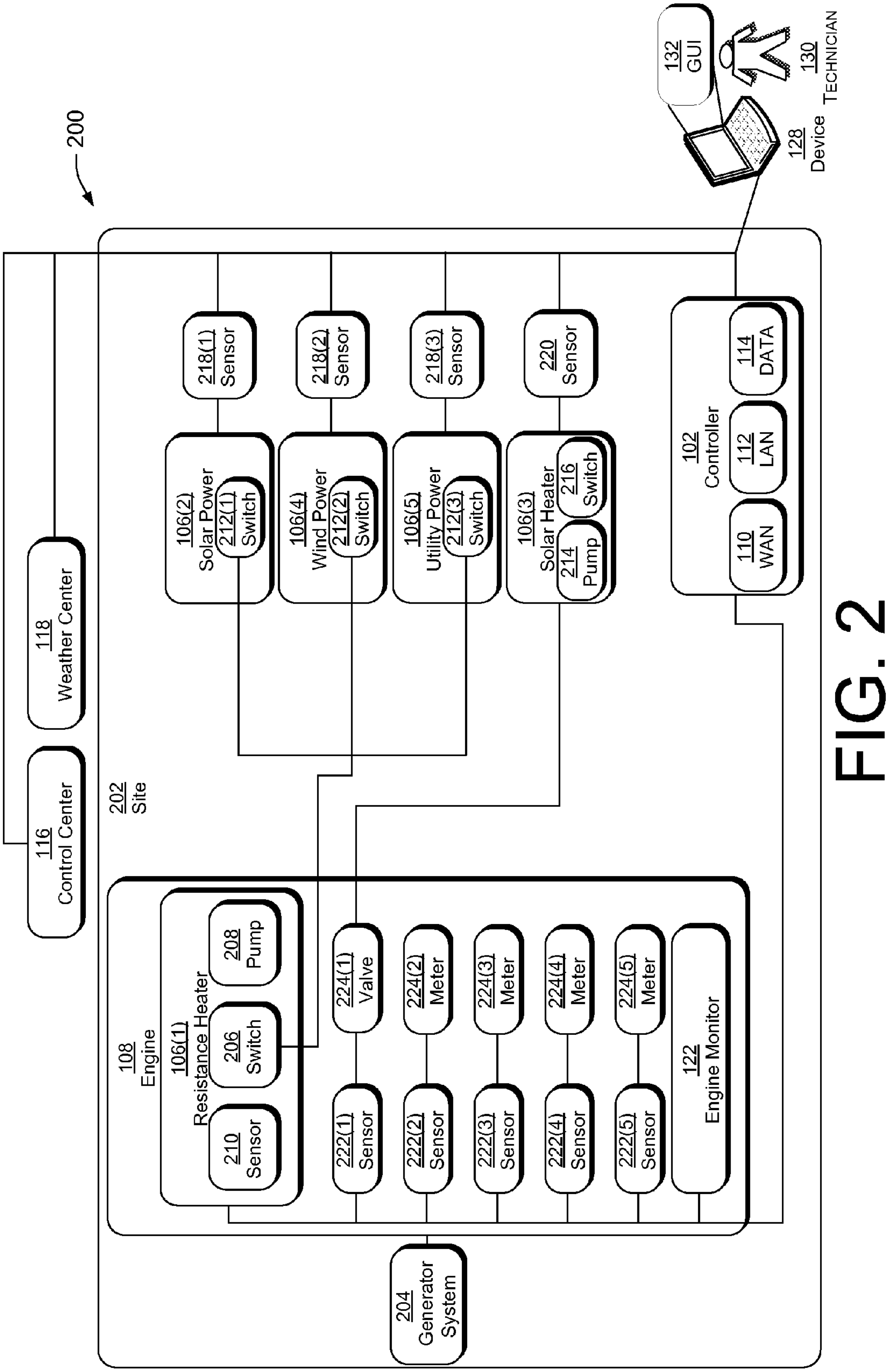
FIG. 2 illustrates another example implementation of the controller of FIG. 1 for use in a site including a set of the plurality of alternative energy sources comprising the resistance heater, the solar power, the solar heater, the wind power, and the utility power of FIG. 1.

FIG. 2 illustrates an example implementation and/or utilization of the controller 102 of FIG. 1 for use at a site 202 of an organization. The site 202 may be configured to include a set of the plurality of alternative energy sources 106(1)-106(N). For example, the site 202 may be configured to include the resistance heater 106(1), the solar power 106(2), the solar heater 106(3), the wind power 106(4), and the utility power 106(5) of FIG. 1.

FIG. 2 illustrates that the engine 108 may provide power for a backup generator system 204 of the site 202. The controller 102 may manage energy consumption from any one of the alternative energy sources 106(1)-106(5) to keep the engine 108 within a desired temperature range to provide for the engine 108 to start and run the backup generator system 204 at full load.

FIG. 2 illustrates that the resistance heater 106(1) may include a switch 206, a pump 208, and one or more sensor(s) 210. The switch 206 may be a pulse-width modulation (PWM) electronic power switch communicatively coupled, via the WAN port 110 and/or the LAN port 112, with the controller 102. The resistance heater 106(1) may be configurable to use a wide range of voltages and wattages and produce a range of wattages to produce heat. Thus, the resistance heater 106(1) has greater flexibility in utilizing supply power (e.g., amperage) as compared to traditional resistance heaters configured to use a single voltage and wattage. For example, the PWM may produce any desired kilowatt for the resistance heater 106(1) to produce heat. The controller 102 may comprise a control scheme to vary input voltage and vary output wattage and control a temperature of the resistance heater 106(1). Further, the controller 102 may comprise a proportional-integral-derivative (PID) controller and algorithm to control the resistance heater 106(1). The controller 102 may also control the pump 208 of the resistance heater 106(1). For example, the controller 102 may be communicatively coupled, via the WAN port 110 and/or the LAN port 112, with the pump 214 to turn on and/or off the pump 214.

The one or more sensor(s) 210 of the resistance heater 106(1) may provide inputs to the controller 102. For example, the one or more sensor(s) 210 may provide signals or data, to the controller 102, regarding inlet and/or outlet coolant temperatures of the resistance heater 106(1). Further, the one or more sensor(s) 210 may provide signals or data, to the controller 102, regarding voltage, amperage, resistance, wattage, and/or frequency of the resistance heater 106(1). Moreover, the one or more sensor(s) 210 may provide signals or data, to the controller 102, regarding wattage, speed, and/or pressure of the pump 208. Based on the provided signals or data, the controller 102 may determine the pump 208 is primed or not primed. The controller 102 may provide to the technician 130, via the GUI 132, a notice to check isolation valves, a diagram of where the problem may be located, a notice that the pump is not priming, a notice that there is a low level of fluid, a notice there is a low level of pressure, etc. Further, the controller 102 may automatically initiate a restart procedure to prime the pump. It is to be appreciated that the controller 102 may provide these notices and diagrams for any additional pumps arranged at the site, or other sites.

The solar power 106(2), wind power 106(4), and/or utility power 106(5) may include transfer switches 212(1), 212(2), and 212(3) electrically interconnected with the resistance heater 106(1). For example, each of the transfer switches 212(1)-212(3) may be electrically interconnected with the switch 206 of the resistance heater 106(1). The switch 206 of the resistance heater 106(1) may be configured to utilize supply power provided by each of the transfer switches 212(1)-212(3) electrically interconnected with the solar power 106(2), wind power 106(4), and utility power 106(5). For example, the transfer switch 212(1) of the solar power 106(2) may connect an inverter to the switch 206 of the resistance heater 106(1). Similarly, the transfer switch 212(2) of the wind power 106(4) may connect an inverter to the switch 206 of the resistance heater 106(1). Further, the transfer switch 212(3) of the utility power 106(5) may connect to the switch 206 of the resistance heater 106(1). The controller 102 may be communicatively coupled, via the WAN port 110 and/or the LAN port 112, with each of the switches 212(1)-212(3) to turn on and/or off supply power to the resistance heater 106(1), provided by each of the solar power 106(2), wind power 106(4), and utility power 106(5).

The solar power 106(2), wind power 106(4), and/or utility power 106(5) may each include one or more sensor(s) 218(1), 218(2), and 218(3) communicatively coupled with the controller 102. The one or more sensor(s) 218(1), 218(2), and 218(3) may provide signals or data, to the controller 102, regarding voltage and/or amperage of electricity of the solar power 106(2), wind power 106(4), and/or utility power 106(5).

FIG. 2 illustrates that the solar heater 106(3) may include a pump 214 and a switch 216. The controller 102 may control the pump 214 via the switch 216. For example, the controller 102 may be communicatively coupled, via the WAN port 110 and/or the LAN port 112, with the switch 216 to turn on and/or off the pump 214. The solar heater 106(3) may include one or more sensor(s) 220 communicatively coupled with the controller 102. The one or more sensor(s) 220 may provide signals or data, to the controller 102, regarding wattage, speed, and/or pressure of the pump 214. Further, the one or more sensor(s) 220 may provide signals or data, to the controller 102, regarding inlet and/or outlet coolant temperatures of the solar heater 106(3). Moreover, the one or more sensor(s) 220 may provide signals or data, to the controller 102, regarding a temperature of the solar heater 106(3).

FIG. 2 illustrates that the engine 108 may include one or more sensor(s) 222(1), 222(2), 222(3), 222(4), and 222(5)

communicatively coupled with the controller 102. The one or more sensor(s) 222(1)-222(5) may provide signals or data, to the controller 102, regarding components of the engine 108. For example, the sensor 222(1) may be associated with a valve 224(1), and provide signals or data, to the controller 102, regarding a state of the valve 224(1). For example, the sensor 222(1) may provide signals or data indicating that the valve 224(1) is open, partially open, and/or closed. Moreover, the solar heater 106(3) may be interconnected with the valve 224(1) (e.g., interconnected with a coolant circuit), and the controller 102 may open, partially open, and/or close the valve 224(1) to manage consumption of heated fluid from the solar heater 106(3). For example, the controller 102 may open the valve 224(1) to consume heated fluid from the solar heater 106(3) to directly heat the engine coolant fluid. The sensor 222(2) may be associated with a meter 224(2), and provide signals or data, to the controller 102, indicating that the engine 108 is operating and/or not operating. The sensor 222(3) may be associated with a meter 224(3), and provide signals or data, to the controller 102, indicating a temperature of the engine 108. The sensor 222(4) may be associated with a meter 224(4), and provide signals or data, to the controller 102, indicating a pressure of the engine 108. The sensor 222(5) may be associated with a meter 224(5), and provide signals or data, to the controller 102, indicating a flow rate of a coolant and/or a lubricant of the engine 108. While FIG. 2 illustrates five engine parameter sensors 222(1)-222(5), any number of sensors may be utilized to determine fewer or more engine parameters. For example, some or all of the sensors 222(1)-222(5) may be redundant because the engine monitor 122 may include some or all of the sensors 222(1)-222(5).

Figure 3:
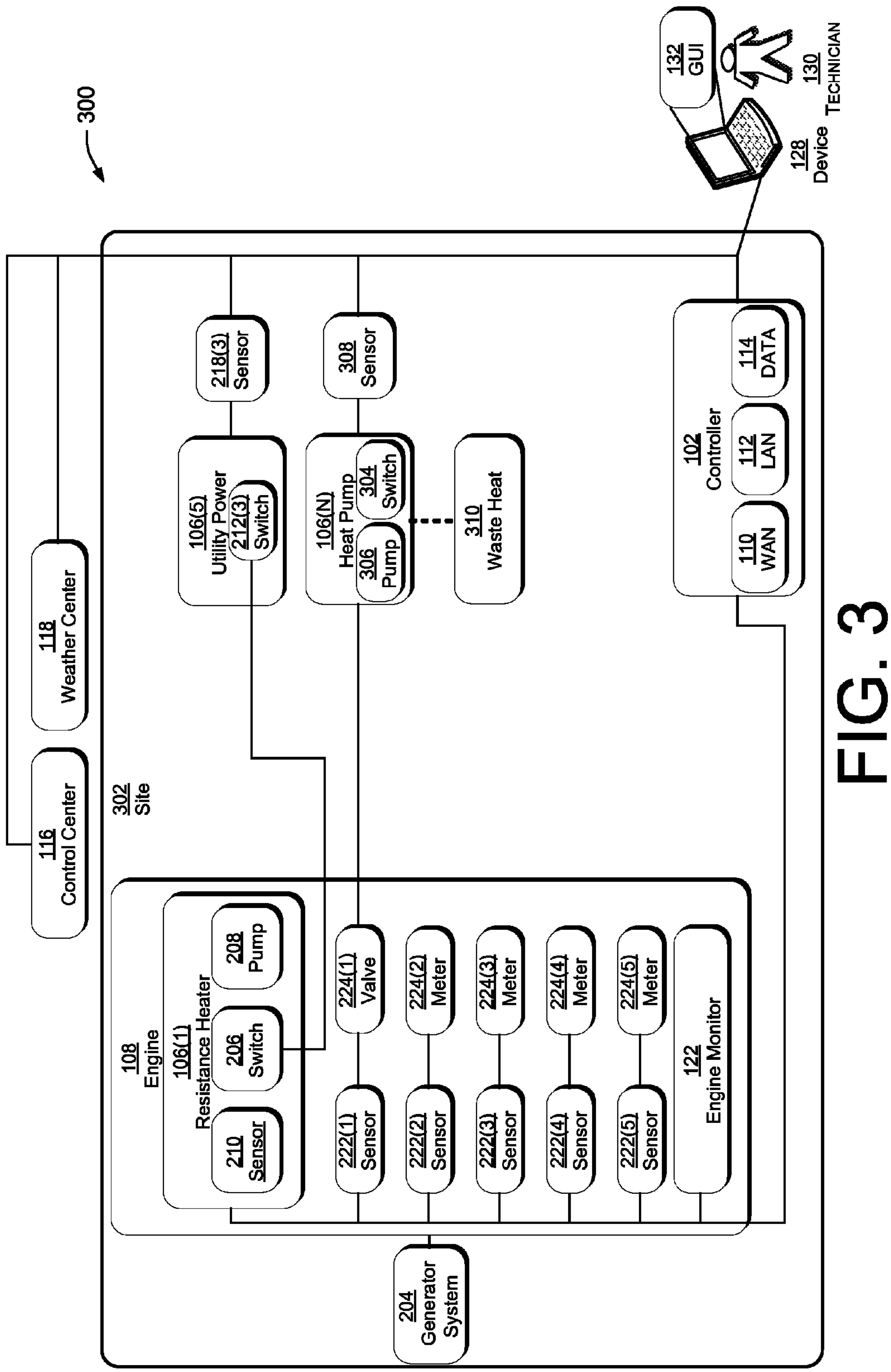
FIG. 3 illustrates another example implementation of the controller of FIG. 1 for use in a site including a plurality of alternative energy sources comprising a heat pump, a resistance heater, and the utility power of FIG. 1.

FIG. 3 illustrates another example implementation 300 of the controller 102 of FIG. 1 for use at a site 302 of an organization. The site 302 may be configured to include a set of the plurality of alternative energy sources 106(1)-106(N). For example, the site 302 may be configured to include the resistance heater 106(1) and the heat pump 106(N) of FIG. 1.

FIG. 3 illustrates that the engine 108 may provide power for a backup generator system 204 of the site 302. The controller 102 may manage energy consumption from either one of the alternative energy sources 106(1) and 106(N) to keep the engine 108 within a desired temperature range to provide for the engine 108 to start and run the backup generator system 204 at full load.

FIG. 3 illustrates that the heat pump 106(N) may include a switch 304, a pump 306, and one or more sensor(s) 308. The controller 102 may control the pump 306 via the switch 304. For example, the controller 102 may be communicatively coupled, via the WAN port 110 and/or the LAN port 112, with the switch 304 to turn on and/or off the pump 306. The one or more sensor(s) 308 may be communicatively coupled, via the WAN port 110 and/or the LAN port 112, with the controller 102. The one or more sensor(s) 308 may provide signals or data, to the controller 102, regarding wattage, speed, and/or pressure of the pump 306. Further, the one or more sensor(s) 308 may provide signals or data, to the controller 102, regarding inlet and/or outlet coolant temperatures of the heat pump 106(N). Moreover, the one or more sensor(s) 308 may provide signals or data, to the controller 102, regarding a temperature of waste heat 310. For example, the site 302 may be a server farm and the servers may produce the waste heat 310. Moreover, the heat pump 106(N) may be a chiller configured to capture the waste heat 310 produced by the servers.

The heat pump 106(N) may be interconnected with the valve 224(1) (e.g., interconnected with a coolant circuit), and the controller 102 may open, partially open, and/or close the valve 224(1) to manage consumption of heated fluid from the heat pump 106(N). For example, the controller 102 may open the valve 224(1) to consume heated fluid from the heat pump 106(N) to directly heat the engine coolant fluid to keep the engine 108 within a desired temperature range.

Example Process of Managing Energy Consumption

Figure 4:
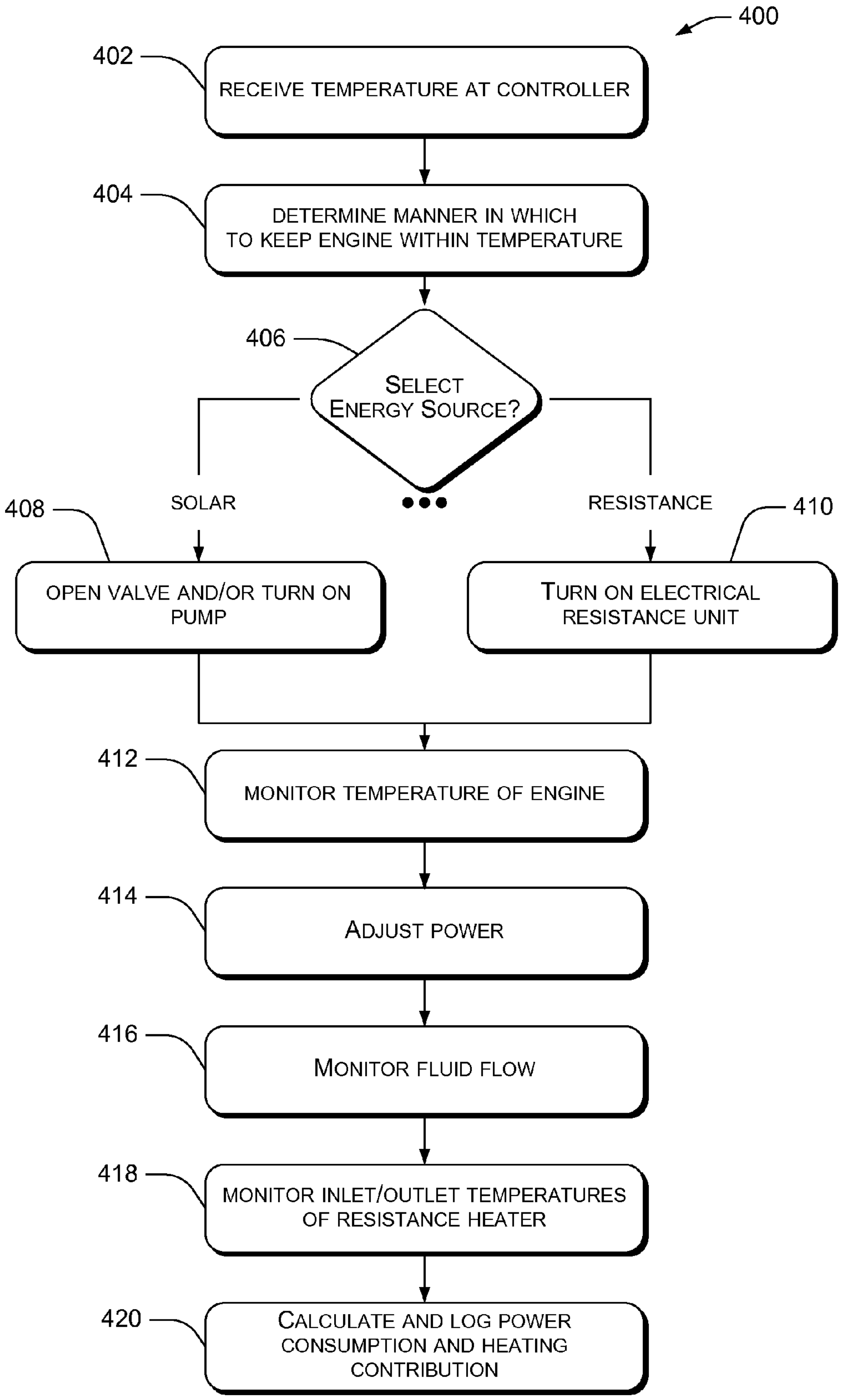
FIG. 4 is a flowchart of an illustrative method of managing energy consumption of a plurality of alternative energy sources, according to one implementation.

FIG. 4 is a flowchart of an illustrative method 400 of the controller 102 taking actions to manage energy consumption of the alternative energy sources 106(1)-106(N) to keep the engine 108 within a desired temperature range. The method 400 begins at 402 with receipt of a temperature of the solar heater 106(3) from the sensor 220. At 404, the controller 102 determines a manner in which to keep the engine 108 within the desired temperature range. The manner in which to keep the engine 108 within the desired temperature range may include heating the engine 108 with heated fluid provided by the solar heater 106(3) or heating the engine 108 with heat provided by the resistance heater 106(3). The manner in which to keep the engine 108 within the desired temperature range may further include heating the engine 108 with the resistance heater 106(1) by utilizing supply power provided by one or more of the solar power 106(2), wind power 106(4), and/or the utility power 106(5).

At 406, a decision or selection is made whether to keep the engine 108 within the desired temperature range by utilizing the solar heater 106(3) or the resistance heater 106(1). The decision or selection may include more than the two alternative energy sources (i.e., the solar heater 106(3) or the resistance heater 106(1)). For example, the decision or selection may include any of the alternative energy sources 106(1)-106(5) to keep the engine 108 within a desired temperature range. For example, the decision whether to keep the engine 108 within the desired temperature range may further include utilizing supply power provided by one or more of the solar power 106(2), wind power 106(4), and/or utility power 106(5). The decision whether to keep the engine 108 within the desired temperature range by utilizing the solar heater 106(3) or the resistance heater 106(1) may be based on a number of different factors, such as if the temperature of the solar heater 106(3) is above a threshold, a cost or rate of the utility power 106(5), an availability of the wind power 106(4), a time of day, an exercise schedule of the engine 108, an operation schedule of the engine 108, a parameter of heating the engine 108 (e.g., minimum/maximum temperatures of the engine), for example.

If the decision is made to keep the engine 108 within the desired temperature range by utilizing the solar heater 106(3), at 408, the controller 102 opens (i.e., energizes) the valve 224(1) in the coolant circuit to the solar heater 106(3). The controller 102 may also turn on (i.e., energize) the pump 214 at the solar heater 106(3) to create circulation of the heated fluid. Moreover, if the controller 102 makes the decision to utilize the solar heater 106(3), the controller 102 may monitor the inlet and/or outlet coolant temperatures of the solar heater 106(3) provided by the one or more sensor(s) 220, and determine if the outlet coolant temperature is greater than the inlet coolant temperature. If the outlet coolant temperature is greater than the inlet coolant temperature, the controller 102 continues to energize the valve 224(1) and/or the pump 214. However, if the controller 102 receives a temperature from the sensor 222(3) of the engine 108 that exceeds a threshold, the controller 102 may de-energize the valve 224(1) and/or the pump 214.

If the decision is made to keep the engine 108 within the desired temperature range by utilizing the resistance heater 106(1), at 410, the controller 102 may turn on a resistance unit (e.g., resistance heater). In one example, at 410, the controller closes (i.e., de-energizes) the valve 224(1) and/or turns off the pump 214, if the valve 224(1) is open and/or the pump 214 is on. However, if the valve 224(1) is already closed and/or the pump is already off the controller 102 doesn't open the valve 224(1) and/or turn on the pump 214.

At 412, the controller 102 monitors the temperature from the sensor 222(3) of the engine 108. At 414, the controller 102 adjusts or modulates, via the PWM switch 206, power to the resistance heater 106(1) to reduce heat output by the resistance heater 106(1) to make the solar heater 106(3) the primary heat source. At 416, the controller 102 monitors fluid flow of the engine 108 and the solar heater 106(3). At 418, the controller 102 monitors inlet and/or outlet coolant temperatures of the resistance heater 106(1). At 420, the controller 102 calculates and logs power consumption of the resistance heater 106(1), and calculates and logs the heating contribution of the solar heater 106(3) to keep the engine within the desired temperature range. Moreover, if the controller 102 made the decision to keep the engine 108 within the desired temperature range by utilizing supply power provided by one or more of the solar power 106(2), wind power 106(4), and/or utility power 106(5), the controller 102 may calculate and log supply power provided by each of the solar power 106(2), wind power 106(4), and/or utility power 106(5). Further, if the controller 102 made the decision to keep the engine 108 within the desired temperature range by utilizing the heat pump 106(N), the controller 102 may calculate and log the heating contribution of the solar heater 106(3) to keep the engine 108 within the desired temperature range.

Example Management System

Figure 5:
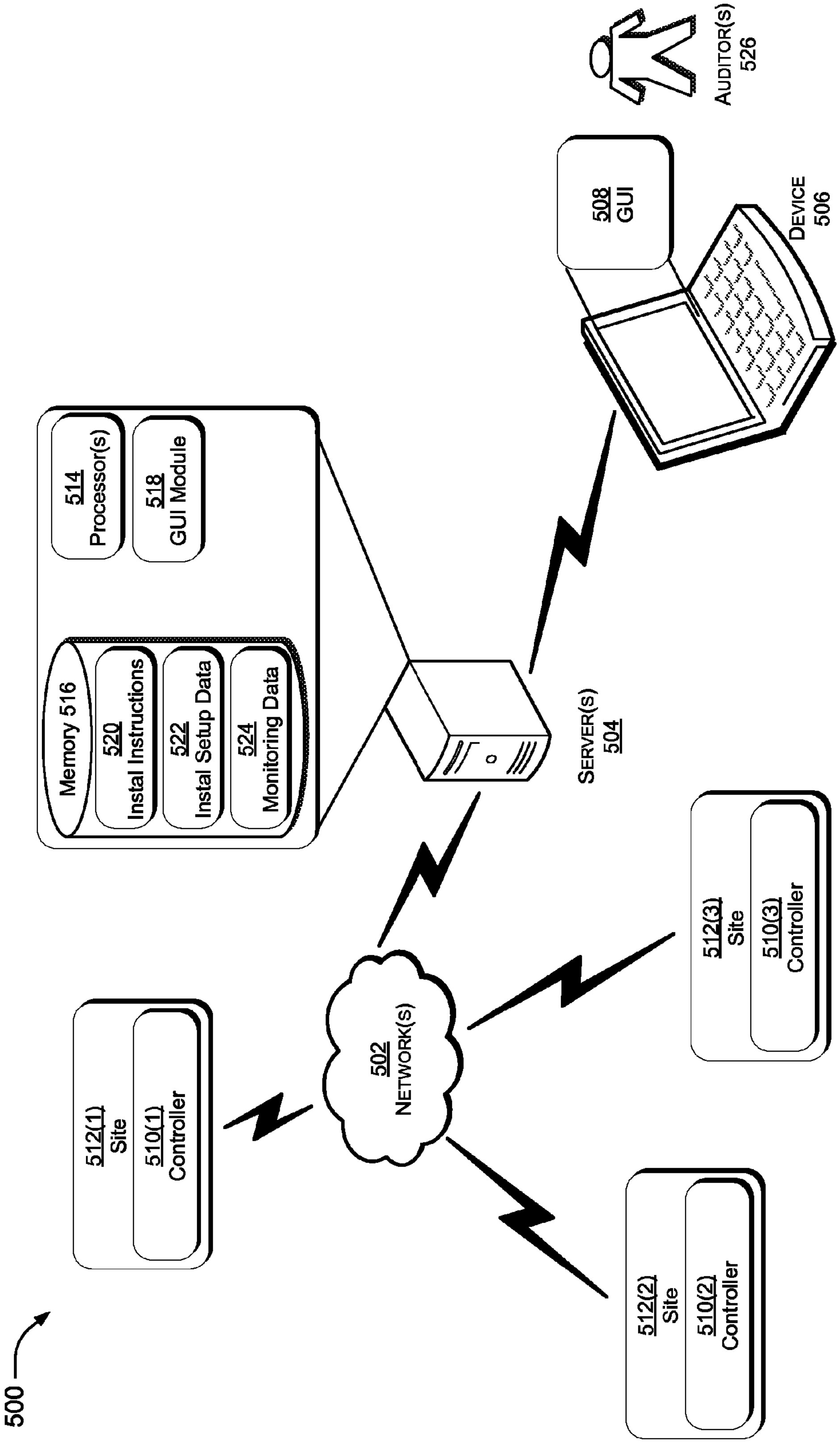
FIG. 5 illustrates an example implementation of an energy consumption controller network infrastructure communicatively coupled with an energy consumption server, along with a user device displaying an energy consumption management GUI provided by the energy consumption server.

FIG. 5 illustrates an example implementation of an energy consumption controller network infrastructure 500. A network 502 may be communicatively coupled with an energy consumption server 504, along with a user device 506 displaying an energy consumption management GUI 508 provided by the energy consumption server 504. The energy consumption server 504 may be for managing energy consumption of any one of the alternative energy sources 106(1)-106(N) to keep the engine 108 within a desired temperature range to provide for the engine 108 to start and run at full load.

FIG. 5 illustrates that the server 504 may be communicatively connected with a plurality of controllers 510(1), 510(2), and 510(3). Each controller 510(1)-510(3) may be arranged at a respective site 512(1), 512(2), and 512(3). For example, server 504 may be communicatively connected with a controller 510(1) (e.g., controller 102) located at a site 104, and a controller 510(2) (e.g., controller 102) located at a site 202, and a controller 510(3) (e.g., controller 102) located at site 302, respectively. While FIG. 5 illustrates the server 504 being communicatively connected with three controllers, each located at a respective site, the server 504 may be communicatively connected with any number of controllers located at respective sites. The server 504 may be communicatively connected with the controllers 510(1)-510(3) via a network.

FIG. 5 illustrates that the server 504 may comprise a processor(s) 514, memory 516, and a GUI module 518. The memory 516 may be configured to store instructions executable on the processor(s) 514, and may comprise installation instructions 520, installation setup data 522, and monitoring data 524. FIG. 5 further illustrates the server 504 communicatively connected with a user device 506 displaying a GUI 508 to an auditor(s) 526. The server 504 may also be configured to add in data from utility companies. For example, the server 504 may store in its memory 516 power pricing data made available by utility companies. The server 504 may also be configured to add in data from weather centers (e.g., weather center 118). For example, the server 504 may store in its memory 516 weather data made available by a national weather service, a local weather forecast office, a private weather station, or the like.

The memory 516 may store instructions that are executable on the processor(s) 514 and that are configured to provide the installation instructions 520 to each of the controllers 510(1), 510(2), and 510(3) located at site(s) 512(1), 512(2), and 512(3), respectively. Each of the installation instructions 520, provided by the server 504, may be specifically tailored for a site(s) 512(1), 512(2), and 512(3), respectively. For example, server 504 may provide a uniquely tailored installation instruction 520 to a controller 102 located at site 104. The provided installation instruction 520 may provide a technician (e.g., technician 130) with technical requirements for a set of the alternative energy sources 106(1)-106(N) utilized at site 104. Further, the provided installation instructions 520 may provide a technician with warnings, installation errors, and/or contractual agreements for site 104.

The memory 516 may store instructions that are executable on the processor(s) 514 and that are configured to provide the installation setup data 522 to each of the controllers 510(1), 510(2), and 510(3) located at site(s) 512(1), 512(2), and 512(3), respectively. Each of the installation setup data 522, provided by the server 504, may be previously saved settings for a site(s) 512(1), 512(2), and 512(3), respectively. For example, server 504 may provide a saved installation setup 522 to a controller 102 located at site 104. The provided saved installation setup 522 may provide a technician with configuration data for a set of the alternative energy sources 106(1)-106(N) utilized at site 104.

In addition, the memory 516 may store instructions executable on the processor(s) 514 to receive signals or data from the controllers 510(1), 510(2), and 510(3) located at site(s) 512(1), 512(2), and 512(3), respectively. The received signals or data may comprise a plurality of reported sensor values, each reported sensor value being identified with a respective alternative energy source (e.g., alternative energy sources 106(1)-106(N)), engine (e.g., engine 108), and/or equipment (e.g., valve 224(1), meters 224(2)-224(5), pumps 214 and 306, and/or switches 206, 212(1)-212(3), 216, and 304). Further, the server 504 memory 516 storing instructions executable on the processor(s) 514 may be configured to integrate the received signals or data from the controllers 510(1), 510(2), and 510(3) located at site(s) 512(1), 512(2), and 512(3), respectively. For example, the server 504 may integrate data from individual sensors (e.g., sensors 222(1)-222(5), 218(1)-218(3), 220, and 308) for each site(s) 512(1), 512(2), and/or 512(3). The memory 516 may also store instructions executable on the processor(s) 514 to provide a GUI (e.g., GUI 132 and/or 508). The GUI may be configured to allow a user (e.g., a technician 130 and/or auditor(s) 526) to audit energy consumption of the alternate energy sources of each site. For example, the GUI may allow a user to audit heating contributions of a solar heater (e.g., solar heater 106(3)), a heat pump (e.g., heat pump 106(N)), and/or supply power provided by solar power (e.g., solar power 106(2)), wind power (e.g., wind power 106(4)), and/or utility power (e.g., utility power 106(5)). The GUI may be configured to provide alerts. For example, the GUI may be configured to provide alerts regarding an installation of a piece of equipment. For example, the GUI may be configured to provide a list of temperatures of concern, a location of the concern, and a description of the problem. Further, the GUI may be configured to provide installation training, diagnostic data, storm risk alerts, engine operation schedules, engine exercise schedules, projected costs, amongst other notifications.

Example Process of Heating an Engine

Figure 6:
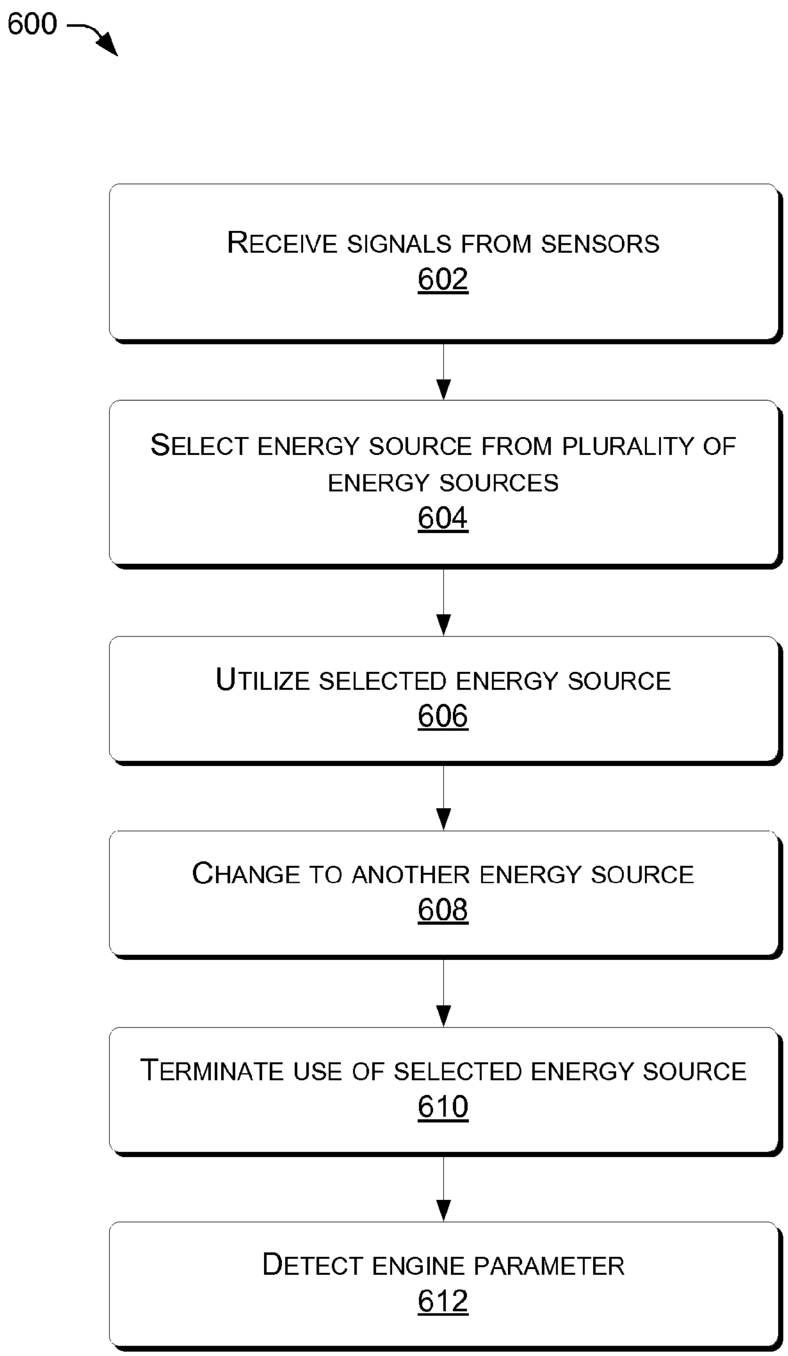
FIG. 6 is a flow diagram that illustrates an example process of heating an engine using the controller of FIG. 1.

FIG. 6 is a flow diagram that illustrates an example process 600 of heating an engine (e.g., engine 108) at a site, such as the site 104 illustrated in FIG. 1, the site 202 illustrated in FIG. 2, or the site 302 illustrated in FIG. 3. While this figure illustrates an example order, it is to be appreciated that the described operations in this and all other processes described herein may be performed in other orders and/or in parallel in some instances. Moreover, the controller 102 and/or the energy consumption server 504 may comprise a processor, and memory storing instructions executable on the processor, to perform acts in the described operations. In the illustrated example, this process begins at operation 602, where a controller (e.g., controller 102) interconnected with each of a plurality of energy sources (e.g., plurality of alternative energy sources 106(1)-106(N)) may receive signals or data from sensors (e.g., sensors 222(1)-222(5), 218(1)-218(3), 220, and 308) identified with a respective alternative energy source, the engine, and/or equipment (e.g., valve 224(1), meters 224(2)-224(5), pumps 214 and 306, switches 206, 212(1)-212(3), 216, and 304).

Process 600 may include operation 604, which represents the controller selecting an energy source from the plurality of energy sources. For example, the controller may select a solar heater (e.g., solar heater 106(3)) to keep the engine within a desired temperature range by utilizing a fluid heated by the solar heater. The selection of the solar heater to keep the engine within the desired temperature range may be based on a number of different factors, such as if a temperature of the solar heater is above a threshold, a time of day, an exercise schedule of the engine, an operation schedule of the engine, an operation schedule of the plurality of energy sources, a threshold of heating the engine (e.g., minimum/maximum temperatures of the engine), for example. Moreover, selection of the solar heater to keep the engine within the desired temperature range may be further based on availability and/or cost of supply power provided by one or more of solar power (e.g., solar power 106(2)), wind power (e.g., wind power 106(4)), and/or utility power (e.g., utility power 106(5)).

Operation 604 may be followed by operation 606, which represents the controller utilizing the selected energy source to keep the engine within the desired temperature range. For example, if the controller selected the solar heater to keep the engine within the desired temperature range, the controller may open (i.e., energize) valve (e.g., valve 224(1)) and/or pump (e.g., pump 214) to create circulation of the heated fluid and keep the engine within the desired temperature range with the heated fluid.

Process 600 may include operation 608, which represents the controller changing to another energy source (e.g., utility power 106(5)) to keep the engine within the desired temperature range based at least in part on a cost. The controller may evaluate the change to the other energy source to keep the engine within the desired temperature range. For example the controller may evaluate a cost of the utility power and evaluate a cost of operating the solar power energy source. For example, the controller may calculate that the cost or rate of the utility power may be lower than the cost of operating the solar power energy source, or vice versa. The controller may change to another energy source to keep the engine within the desired temperature range based at least in part on a cost of energy of each of the plurality of energy sources. For example, the controller may evaluate a cost to keep the engine within the desired temperature range by utilizing a resistance heater (e.g., resistance heater 106(1)), solar power (e.g., solar power 106(2), wind power (e.g., wind power 106(4)), and/or a heat pump (e.g., heat pump 106(N)). The controller may change to another energy source to keep the engine within the desired temperature range based at least in part on a change in availability of energy from at least one of the plurality of energy sources. For example, the controller may change to utility power because of a lack of solar power and/or wind power. The controller may change to another energy source to keep the engine within the desired temperature range based at least in part on a threshold temperature of heating the engine. For example, the controller may change to the solar heater to keep the engine within the desired temperature range based on a reported temperature of the solar heater exceeding a minimum threshold temperature of the engine. The controller may change to the other energy source to change to another desired temperature range different from the desired temperature range to keep the engine within the other desired temperature range based at least in part on an imminent threat. For example, the controller may change to the other energy source to change to a desired temperature range higher than the desired temperature range base on a storm risk.

Process 600 may include operation 610, which represents the controller terminating a use of the other energy source to keep the engine within the desired temperature range, and sending a signal to an engine control unit which initiates operation of the engine based at least in part on an imminent threat or other pre-determined condition. For example, the controller may terminate a use of the resistance heater keeping the engine within the desired temperature range and send a signal to the engine control unit to initiate operation of the engine based on a storm risk.

Process 600 may be completed at operation 612 in some instances, which represents the controller detecting an engine parameter. The controller may detect an engine parameter outside a threshold, and send a signal to the engine control unit. For example, the controller may detect a lack of coolant and send a signal to the engine control unit to provide for the engine control unit to make a determination whether to terminate operation of the engine. The controller may detect an engine parameter, and rate an installation of components interconnected with the engine based at least in part on the detected engine parameter. For example, the controller may detect a flow rate of an engine coolant and rate the installation of a valve as being open, partially open, and/or closed. The controller may detect an engine parameter and diagnose a condition of the engine. For example, the controller may detect a temperature of the engine and diagnose an idle or terminated state of the engine.

Illustrative Interfaces

FIG. 7A-7G illustrate example interfaces to remotely manage capabilities of energy consumption of alternate energy sources using the controller of FIG. 1. For ease of illustration these example interfaces are described as being displayed on the device 128 of FIG. 1. However, these interfaces may be displayed through other devices. For example, these example interfaces may be displayed through device 506 of FIG. 5. Moreover, the controller 102 and/or the energy consumption server 504 may comprise a processor, and memory storing instructions executable on the processor, to display these example interfaces through other devices.

Figure 7A:
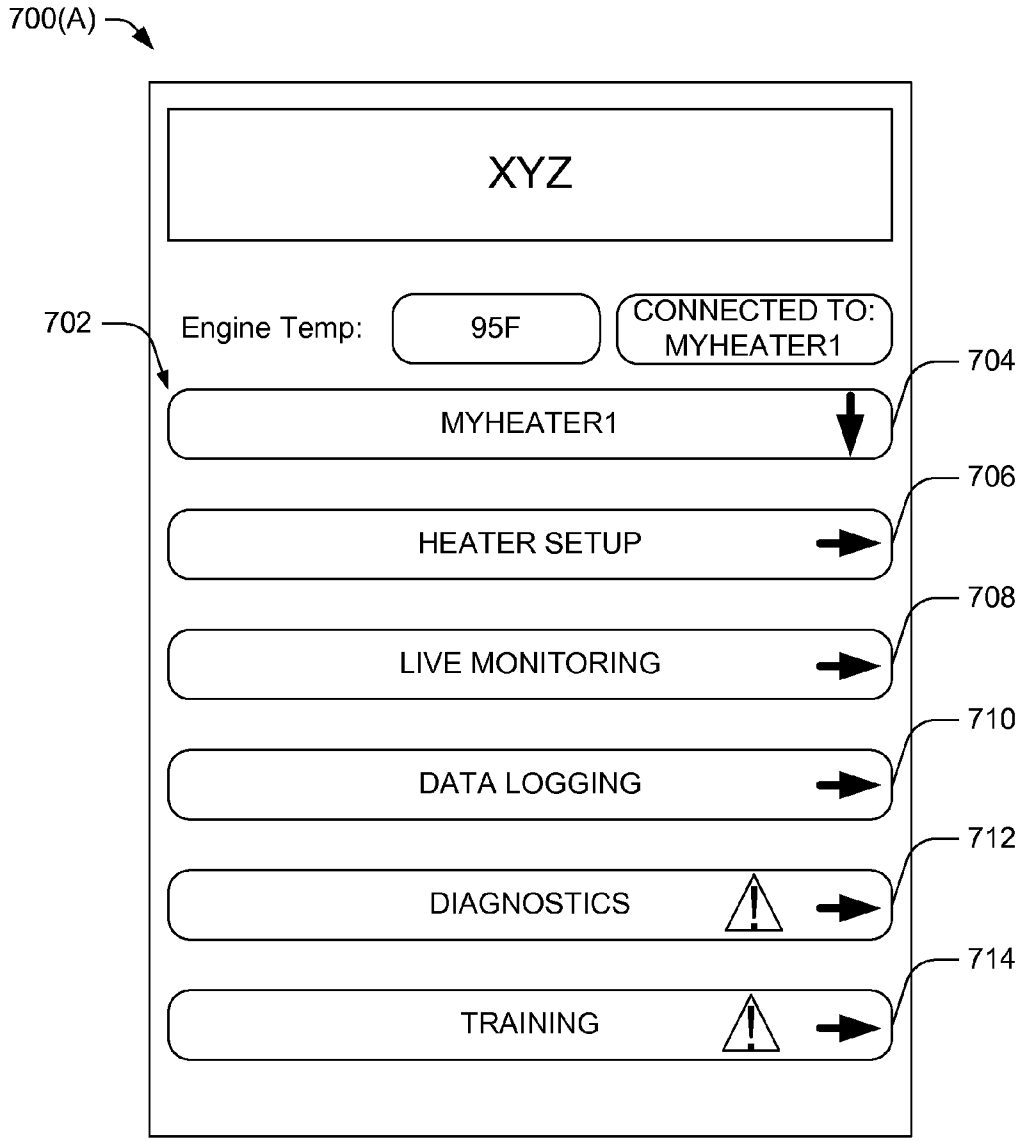
FIGS. 7A-7G illustrate example interfaces to remotely manage capabilities of energy consumption of alternate energy sources using the controller of FIG. 1.

FIG. 7A illustrates an example interface 700(A) to navigate a set of a plurality of alternative energy sources (e.g., plurality of alternative energy sources 106(1)-106(N)) that are present at a site (e.g., site 104). The interface 700(A) may include a navigation area 702 for navigating through a heater dropdown list 704. The heater dropdown list 704 may include a heater setup icon 706, a monitoring icon 708, a data logging icon 710, a diagnostics icon 712, and/or a training icon 714. In the interface 700(A), an individual may select (e.g., by right/left clicking on mouse or otherwise) the heater dropdown list 704, the heater setup icon 706, the monitoring icon 708, the data logging icon 710, a diagnostics icon 712, and/or a training icon 714. The heater drop down list 704 may provide a list of heaters (e.g., plurality of alternative energy sources 106(1)-106(N)) that are present at the site(s) associated with the user of the organization or provide a window to enter a new heater. The heater setup icon 706 may display, in a new interface, setting on existing heaters, provide for setup of a new heater, and/or edit existing settings on heaters. The monitoring icon 708 may display, in a new interface, all sensor inputs for the current heater (e.g., sensors 210)). The data logging icon 710 may display, in a new interface, historical data (e.g., monitoring data 524) used for later analysis and/or export. The diagnostics icon 712 and/or the training icon 714 may display, in a new interface, warnings, install errors, training information, and/or an alert icon.

Figure 7B:
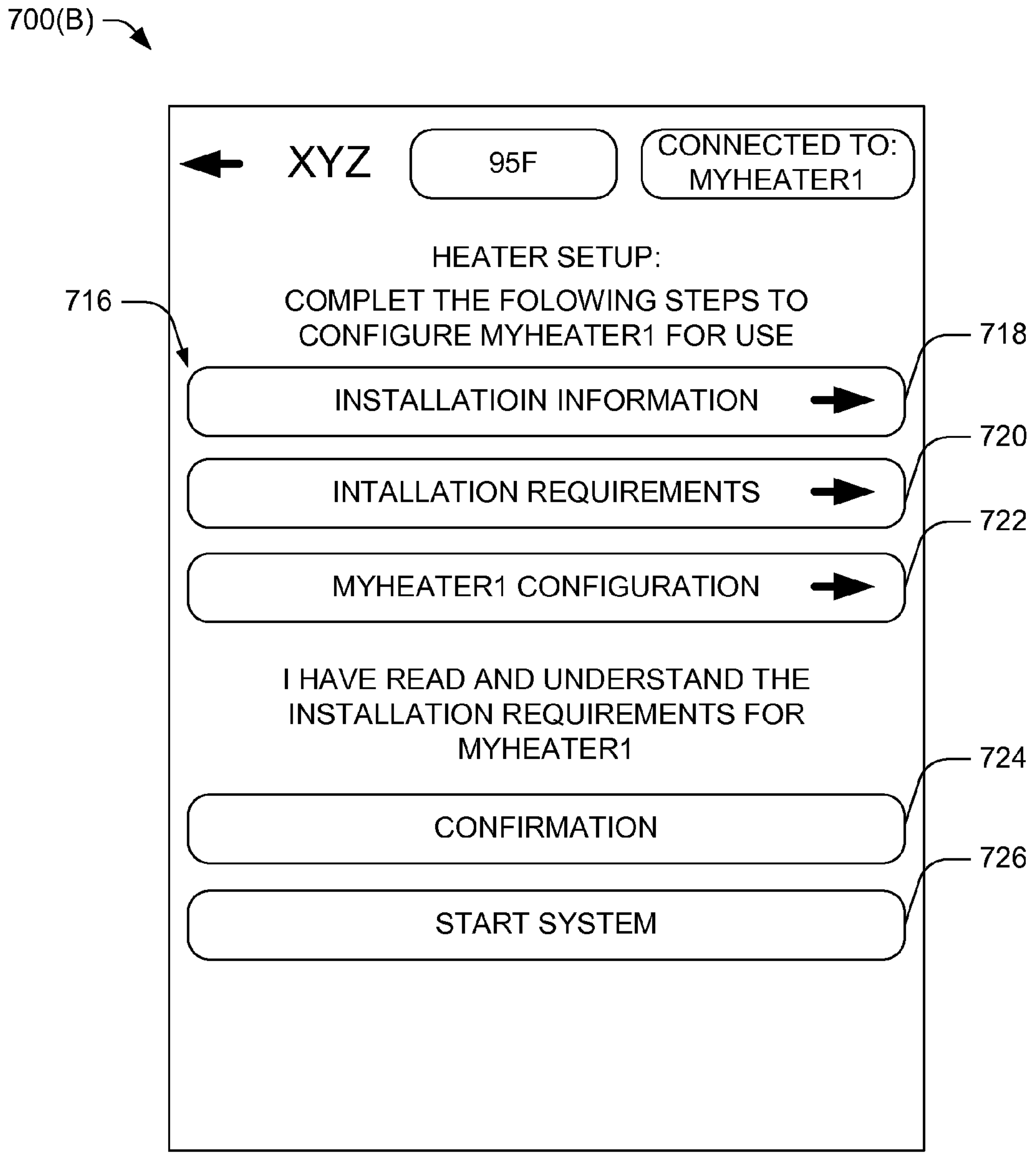

FIG. 7B illustrates, upon selection of the heater setup icon 706, an example interface 700(B) to navigate an initial heater setup. The interface 700(B) may include a navigation area 716 for navigating through an installation info icon 718, an installation requirements icon 720, a heater configuration icon 722, a confirmation icon 724, and/or a start heating icon 726. The installation info icon 718 may display, in a new interface, application information for the selected heater, engine type, site location, customer identification, etc. The installation requirements icon 720 may display, in a new interface, technical requirements for the heater installation and/or installation training. For example, the installation requirements icon 720 may display a minimum hose and/or pipe size (e.g., minimum inside diameter), fluid inlet and outlet integration points, fluid inlet and outlet size(s), valve(s) integration points, minimum valve size(s), required plumbing sealant type(s), etc. The heater configuration icon 722 may display, in a new interface, an initial configuration of a new heater or change a configuration of an existing heater. The confirmation icon 724 may only be selected subsequent to completing of the installation steps of the installation info icon 718, meeting the requirements and/or training of the installation requirements icon 720, and completing the steps of the heater configuration icon 722. The start heating icon 726 may only be selected subsequent to the selection of the confirmation icon 724.

Figure 7C:
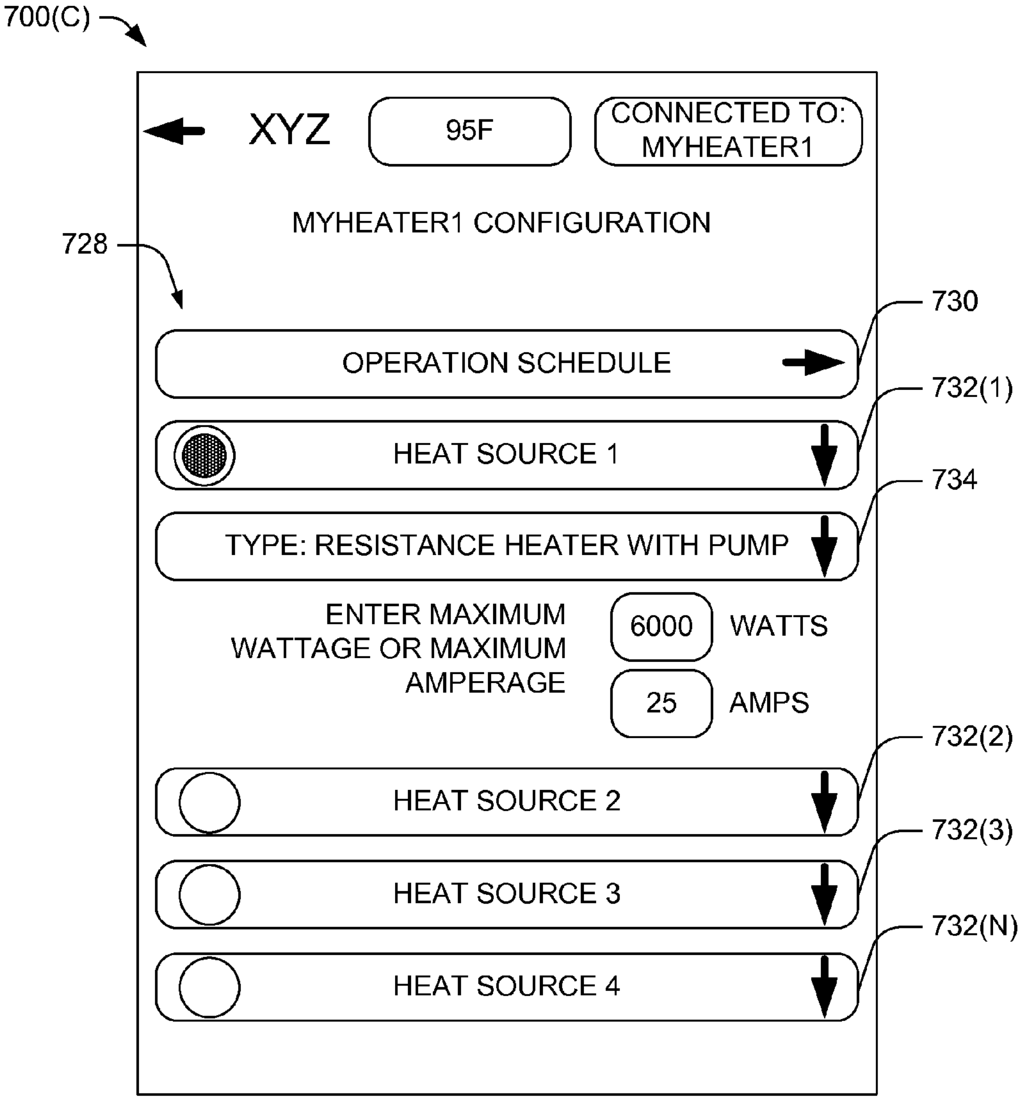

FIG. 7C illustrates, upon selection of the heater setup icon 706, an example interface 700(C) to navigate a heater configuration. The interface 700(C) may include a navigation area 728 for navigating through an operation schedule icon 730, heat source dropdown list(s) 732(1), 732(2), 732(3), 732(N), and/or a type dropdown list 734. The operation schedule icon 730 may display, in a new interface, provide windows enabling a user to set different temperatures of the engine at various times. The heat source dropdown list(s) 732(1), 732(2), 732(3), 732(N) may expand to the type dropdown list 734, to enable a user to enter a maximum watts and/or a maximum amperage for the heat source selected. For example, the heat source dropdown list(s) 732(1)-732(N) may include the plurality of alternative energy sources 106(1)-106(N)) that are present at the site, and each of dropdown list(s) 732(1)-732(N) may enable a user to enter thresholds (e.g., maximum watts, maximum amperage, temperatures, flow rates) for each of the alternative energy sources 106(1)-106(N)) when selected by a user.

Figure 7D:
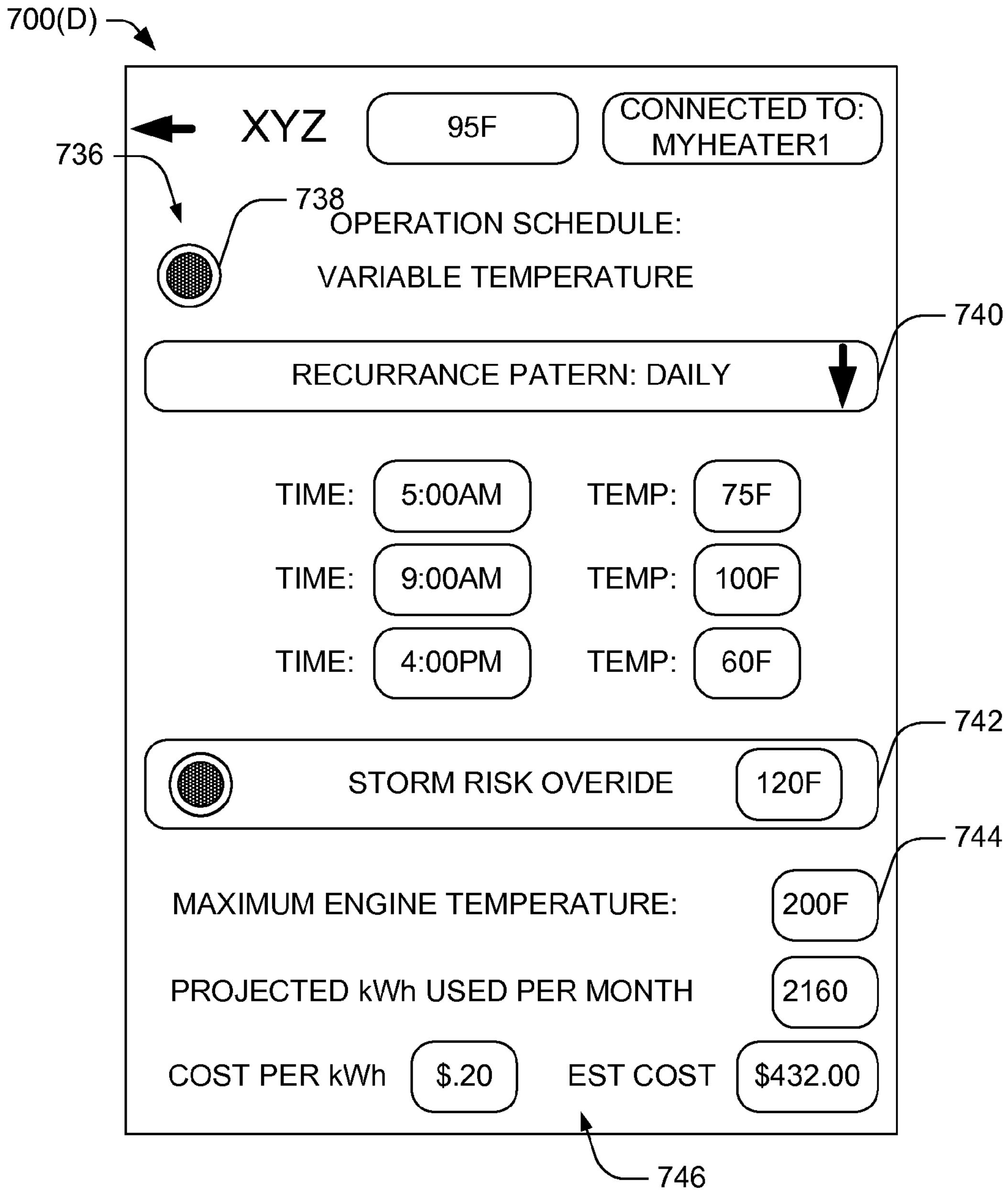

FIG. 7D illustrates, upon selection of the operation schedule icon 730, an example interface 700(D) to navigate a heater operation schedule. The interface 700(D) may include a navigation area 736 for navigating through a variable temperature icon 738, a recurrence dropdown list 740, a storm risk icon 742, a maximum engine temperature icon 744, and/or projected cost(s) icons 746. The variable temperature icon 738 may enable a user to select variable temperatures. The recurrence dropdown list 740 may enable a user to select the type of schedule (e.g., daily, weekly, monthly, etc.) of heating the engine and at a plurality of temperatures. For example, the recurrence dropdown list 740 may enable a user to select three different times during a day that the engine is to be at a particular temperature. The three different temperatures during the different times of the day may be minimum temperatures. For example, the controller will provide an alert if the temperature of the engine is below the recommended minimum temperatures. The storm risk icon 742 may enable a user to set a storm risk override temperature. For example the storm risk icon 742 may enable a user to select to have the heater elevate the temperature of the engine in the case of an imminent threat of harsh weather (e.g., an incoming storm). As discussed above, the controller may receive data from weather centers (e.g., weather center 118) a national weather service, a local weather forecast office, a private weather station, or the like, and activate the storm risk override temperature based on the warning data and/or internal calculations. Further, the settings associated with the storm risk icon 742 may be protected. For example, the temperature setting may be protected to keep users (e.g., customers) from changing the storm risk temperature. Moreover, brownout programs, peak time programs, imminent threat programs may also be protected. The maximum engine temperature icon 744 may be activated when heat sources (e.g., plurality of alternative energy sources 106(1)-106(N)) are present or sensed that can elevate the engine temperature without increasing power usage. Moreover, the maximum engine temperature icon 744 may enable the engine to be used as heat storage or a thermal storage. The projected cost(s) icon 746 may display power and cost calculations. For example, the projected cost(s) icon 746 may display a projected kilowatt-hour(s) (kWh) used per month, a cost per kWh, and/or an estimated cost. The projected kWh used per month, the cost per kWh, and/or the estimated cost may be initially based on default values for heater and application information. However, subsequent to logging the sensors signals the projected kWh used per month, the cost per kWh, and/or the estimated cost may be based on operation history. The projected kWh used per month, the cost per kWh, and/or the estimated cost provides direct feedback to the user (e.g., installer, technician, auditor(s), etc.).

Figure 7E:
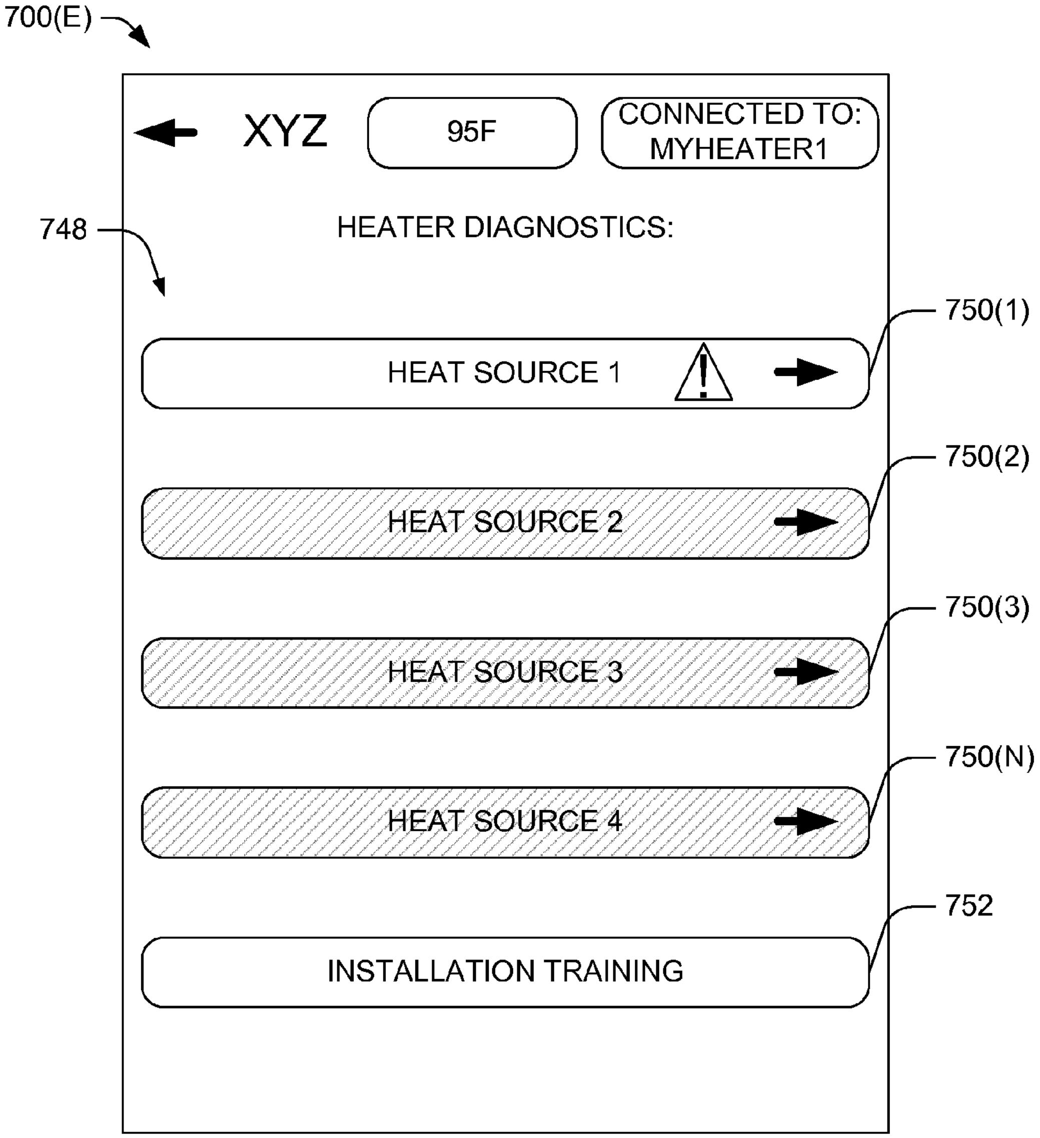

FIG. 7E illustrates, upon selection of the diagnostics icon 712, and/or a training icon 714, an example interface 700(E) to navigate heater diagnostics. The interface 700(E) may include a navigation area 748 for navigating through a plurality of heat source dropdown list(s) 750(1), 750(2),

750(3), and 750(N), and/or an installation training icon 752. The plurality of heat source dropdown list(s) 750(1)-750(N) may include the plurality of alternative energy sources 106(1)-106(N) that are present at the site, and each of dropdown list(s) 750(1)-750(N) may enable, upon selection of one of the drop down list(s) 750(1)-750(N), a user to view parameters associated with the site that are outside thresholds. The dropdown list(s) 750(1)-750(N) may provide an indication (e.g., a warning icon) adjacent to, or on, one or more of the drop down list(s) 750(1)-750(N) indicating a source (e.g., one or more of the plurality of alternative energy sources 106(1)-106(N)) with a problem. For example, a warning icon may be arranged on the drop down list 750(1) associated with heat source 1 (e.g., alternative energy source 106(1)) indicating that the heat source 1 has at least one parameter outside a threshold. The dropdown list(s) 750(1)-750(N) provides a listing of all available heat sources (e.g., alternative energy sources 106(1)-106(N)) that are present at the site, and may display heat sources that are inactive as being greyed out. FIG. 7E illustrates drop down list(s) 750(2), 750(3), and 750(4) associated with heat source 2, heat source 3, and heat source 4, respectively, as being inactive and greyed out. The installation training icon 752 may enable, upon selection of the installation training icon 752, a user to view installation directions based on the heat source. For example, the installation training icon 752 may provide installation directions tailored to a heat source selected by a user. For example, if a user has selected drop down list 750(1) associated with heat source 1 (e.g., alternative energy source 106(1)), the installation training icon 752 may provide installation directions tailored to heat source 1.

Figure 7F:
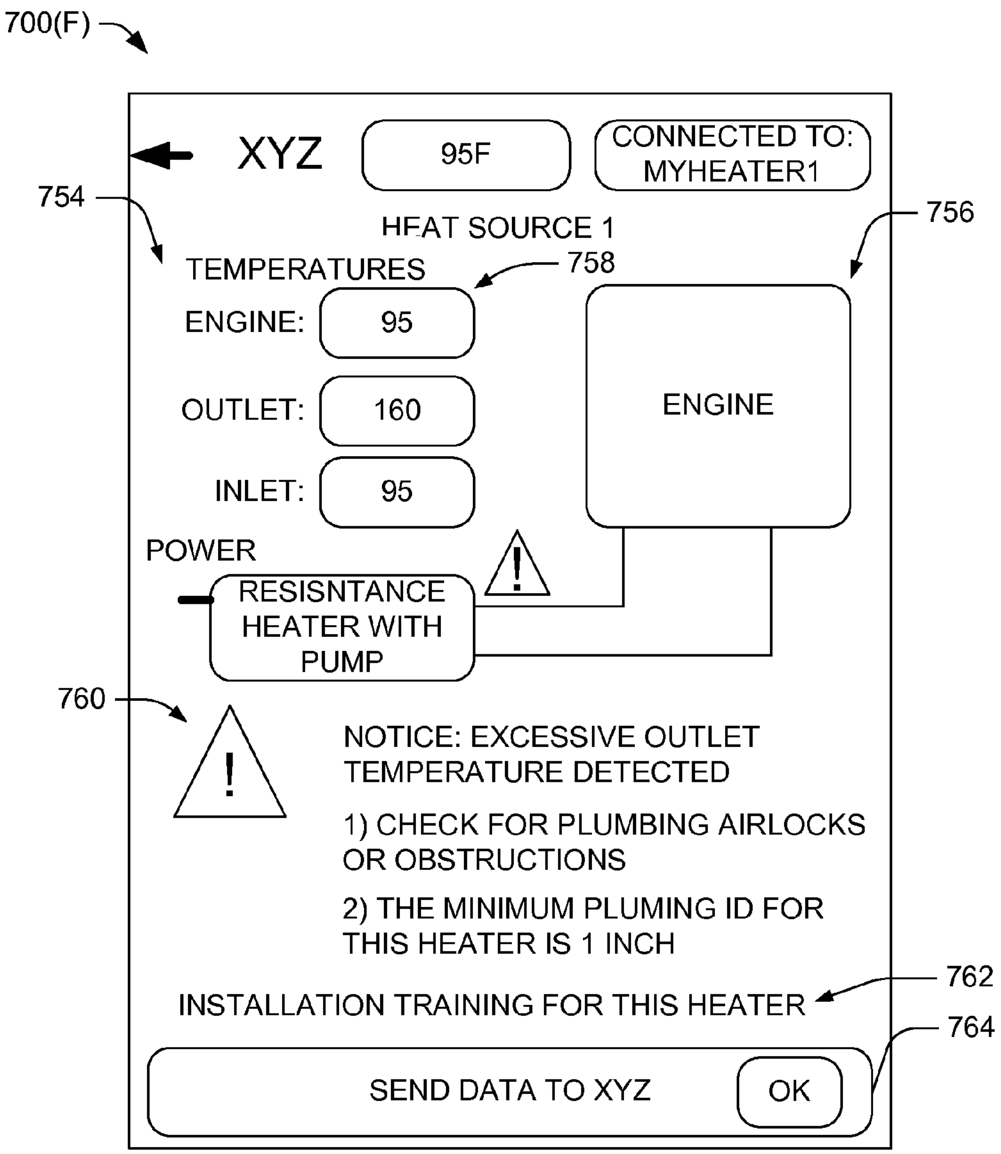

FIG. 7F illustrates, upon selection of one of the drop down list(s) 750(1)-750(N), an example interface 700(F) to navigate an alert level one heat source alert and/or diagnostics. The level one alert may be associated with the controller operating the engine at a reduced level based at least in part on the detected engine parameter. For example, the level one alert may be associated with the controller operating the engine at a reduced level based at least in part on a temperature of a fluid outlet and/or inlet. The interface 700(F) may include a navigation area 754 for navigating through an engine graphic 756, an engine temperature listing 758, an alert icon 760, a link 762, and/or a report icon 764. The engine graphic 756 may provide a user with a graphical representation of the engine (e.g., engine 108) at the site. The engine graphic 756 may illustrate one or more of the heat sources (e.g., plurality of alternative energy sources 106(1)-106(N)) relative to a graphic of the engine. The engine graphic 756 may illustrate plumbing arranged between the engine and the heat sources. For example, the engine graphic 756 may display fluid inlet and/or outlet locations, hose and/or pipe routings, valve(s) (e.g., valve 224(1)) locations, pump (e.g., pump(s) 208, 214, and/or 306) location(s), switch (e.g., switch(s) 206, 212(1)-212(3), 216, and/or 304) location(s), sensor (e.g., sensor(s) 210, 218(1)-218(3), 220, 222(1)-222(5), and/or 308) locations, power input and/or output location(s), etc. The engine graphic 756 may illustrate locations of concern. For example, the engine graphic 756 may display a warning icon (e.g., an international organization for standardization (ISO) alert symbol) adjacent to or on a location of concern. The engine temperature listing 758 may provide a list of temperatures highlighting the one temperature of concern. For example, the engine temperature listing 758 may display an engine temperature, an outlet temperature, and/or an inlet temperature. The outlet and inlet temperatures may be for an engine coolant, and the outlet temperature may be highlighted or emphasized expressing concern that the outlet temperature is outside a threshold, for example. The alert icon 760 may provide a warning icon (e.g., ISO alert symbol), a description of the problem, and/or a listing of possible reasons for the problem. The link 762 may provide online help. For example, the link 762 may provide a video, written instructions, and/or written guidelines, tailored to the source of concern. The report icon 764 may provide for a user to send diagnostic data of the site to an outside service (e.g., a customer service) to aid in problem solving.

Figure 7G:
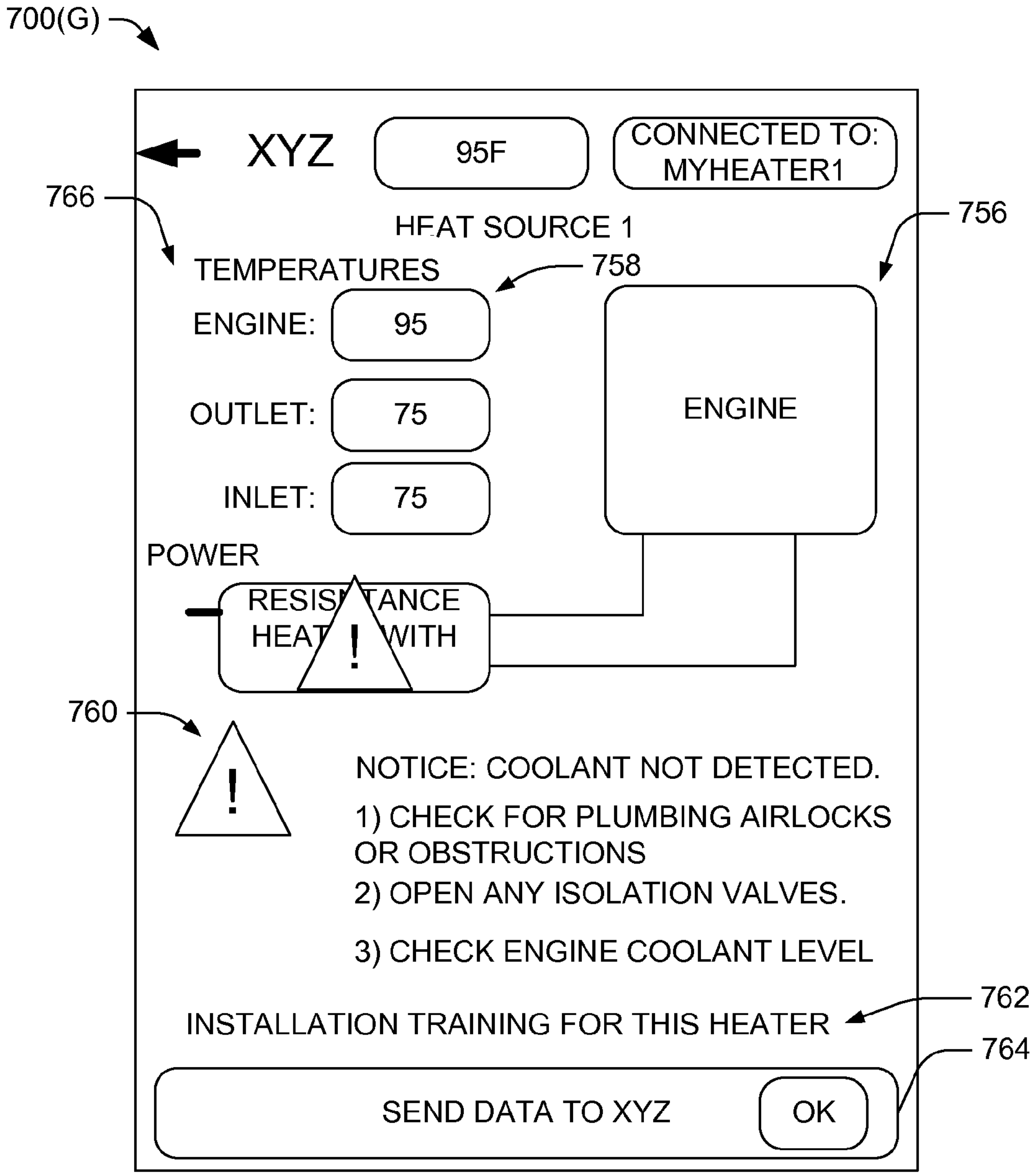

FIG. 7G illustrates, upon selection of one of the drop down list(s) 750(1)-750(N), an example interface 700(G) to navigate an alert level two heat source alert and/or diagnostics. The level two alert may be associated with the controller terminating operation of the resistance heater based at least in part on the detected engine parameter. For example, the level two alert may be associated with the controller terminating operation of the resistance heater based at least in part on a temperature of a fluid outlet and/or inlet. The interface 700(G) may include the navigation area 766 for navigating through the engine graphic 756, the engine temperature listing 758, the alert icon 760, the link 762, and/or the report icon 764. FIG. 7G illustrates the outlet and inlet temperatures of the engine temperature listing 758 being substantially the same. Because the outlet and inlet temperatures are the same the controller may terminate operation of the resistance heater. Moreover, the engine graphic 756 may display an emphasized warning icon (e.g., an international organization for standardization (ISO) alert symbol) adjacent to or on a location of concern. For example, the engine graphic 756 may highlight or emphasize the resistance heater and display the alert symbol on the resistance heater.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An engine heating controller to control a use of a plurality of energy sources, the engine heating controller comprising:

a processor and a memory storing instructions executable on the processor, to perform acts comprising:

receiving data representing a cost per watt of a first energy source of the plurality of energy sources, the first energy source including a wind turbine or a solar panel that provides voltage or amperage of electricity;

selecting, based at least in part on the cost per watt, the first energy source from the plurality of energy sources;

outputting energy from the first energy source to an engine heater, the engine heater to heat a combustion engine of an electric generator of a facility to within a preset temperature range to keep the combustion engine of the electric generator warm until the facility has a critical time of use for the electric generator;

receiving data representing a reduced cost per watt of a second energy source of the plurality of energy sources, the second energy source including a heat pump or a solar heater that provides heated fluid, and the reduced cost per watt being less than the cost per watt of the first energy source; and changing, based at least in part on the reduced cost per watt, to output energy from the second energy source, the second energy source to heat the combustion engine of the electric generator to within the preset temperature range to continue to keep the combustion engine of the electric generator warm until the facility has the critical time of use for the electric generator.

2. The engine heating controller of claim 1, wherein the acts further comprise:

receiving data representing a reduced availability of energy from the first energy source or the second energy source, the reduced availability of energy less than an earlier availability of energy of the first energy source or the second energy source; and changing, based at least in part on the reduced availability, to a third energy source to heat the combustion engine of the electric generator to within the preset temperature range to keep the combustion engine of the electric generator warm until the facility has a critical time of use for the electric generator.

3. The engine heating controller of claim 1, wherein the acts further comprise:

terminating use of the second energy source based at least in part on an imminent threat, the imminent threat defined by a weather service reporting incoming harsh weather; and starting the combustion engine of the electric generator of the facility.

4. The engine heating controller of claim 1, wherein the engine heater comprises a resistance heater.

5. The engine heating controller of claim 1, wherein the acts further comprise:

detecting an engine parameter outside a threshold; and operating the engine heater at a reduced level and/or terminating operation of the engine heater based at least in part on the detected engine parameter.

6. The engine heating controller of claim 1, wherein the acts further comprise:

detecting an engine parameter; and rating components interconnected with the combustion engine based at least in part on the detected engine parameter.

7. The engine heating controller of claim 1, wherein the acts further comprise:

detecting an engine parameter or an engine heater parameter; and diagnosing a condition of the combustion engine or engine heater.

8. The engine heating controller of claim 2, wherein the third energy source comprises utility power.

9. An energy consumption controller to control a use of a plurality of energy sources, the energy consumption controller comprising:

a processor and a memory storing instructions executable on the processor, to perform acts comprising:

receiving data representing a temperature of a combustion engine of an electric generator of a facility from a sensor;

determining that the temperature is outside a preset temperature range to keep the combustion engine of the electric generator warm until the facility has a critical time of use for the electric generator;

accessing, based at least in part on the temperature being outside the preset temperature range to keep the combustion engine of the electric generator warm until the facility has the critical time of use for the electric generator, data representing a cost per watt of a first energy source of a plurality of energy sources, the first energy source including a wind turbine or a solar panel that provides voltage or amperage of electricity;

selecting, based at least in part on the cost per watt, the first energy source from the plurality of energy sources;

outputting energy from the first energy source to an engine heater, the engine heater to heat the combustion engine of the electric generator of the facility to within the preset temperature range to keep the combustion engine of the electric generator warm until the facility has the critical time of use for the electric generator;

receiving data representing a reduced availability of energy from the first energy source, the reduced availability less than an earlier availability of energy of the first energy source; and changing, based at least in part on the reduced availability, to a second energy source including a heat pump or a solar heater that provides heated fluid to heat the combustion engine of the electric generator to within the preset temperature range to keep the combustion engine of the electric generator warm until the facility has the critical time of use for the electric generator.

10. The energy consumption controller of claim 9, wherein the first energy source comprises a wind turbine, and wherein the engine heater comprises a resistance heater, and the wind turbine provides electricity to the resistance heater.

11. The energy consumption controller of claim 9, wherein the second energy source comprises a solar panel, and wherein the engine heater comprises a resistance heater, and the solar panel provides electricity to a resistance heater.

12. The energy consumption controller of claim 9, wherein the memory stores further instructions to implement the following acts:

receiving data representing an imminent threat, the imminent threat defined by a weather service reporting incoming harsh weather; and changing, based at least in part on the imminent threat, to a third energy source, different than the second energy source; and changing, based at least in part on the imminent threat, to a different preset temperature range higher than the preset temperature range.

13. The energy consumption controller of claim 9, further comprising computer-executable instructions to implement the following act:

changing to a third energy source, different than the first energy source or the second energy source based at least in part on an operation schedule of the combustion engine of the electric generator.

14. The energy consumption controller of claim 9, further comprising computer-executable instructions to implement the following act:

changing to a third energy source, different than the first energy source or the second energy source based at least in part on an exercise schedule of the combustion engine of the electric generator.

15. The energy consumption controller of claim 12, wherein the third energy source comprises utility power.

16. An engine heating system, comprising:

an engine heater; and an engine heater controller communicatively coupled to the engine heater and a plurality of energy sources to control a use of the plurality of energy sources, the engine heater controller comprising:

a processor and a memory storing instructions executable on the processor, to perform acts comprising:

receiving data representing a cost per watt of a first energy source of the plurality of energy sources, the first energy source including a wind turbine or a solar panel that provides voltage or amperage of electricity;

selecting, based at least in part on the cost per watt, the first energy source from the plurality of energy sources;

outputting energy from the first energy source to the engine heater, the engine heater to heat a combustion engine of an electric generator of a facility to within a preset temperature range to keep the combustion engine of the electric generator warm until the facility has a critical time of use for the electric generator;

receiving data representing a reduced cost per watt of a second energy source of the plurality of energy sources, the second energy source including a heat pump or a solar heater that provides heated fluid, and the reduced cost less than the cost per watt of the first energy source; and changing, based at least in part on the reduced cost per watt, to output energy from the second energy source, the second energy source to heat the combustion engine of the electric generator to within the preset temperature range to continue to keep the combustion engine of the electric generator warm until the facility has the critical time of use for the electric generator.

17. The engine heating system of claim 16, wherein the acts performed by the processor and the memory further comprise instructions executable on the processor, to perform acts comprising:

receiving data representing a reduced availability of energy from the second energy source, the reduced availability less than an earlier availability of energy of the second energy source; and changing, based at least in part on the reduced availability, to a third energy source to heat the combustion engine to within the preset temperature range to keep the combustion engine of the electric generator warm until the facility has the critical time of use for the electric generator.

* * * * *